(12) United States Patent
Kim et al.

(10) Patent No.: US 11,340,781 B2
(45) Date of Patent: May 24, 2022

(54) ELECTRONIC DEVICE FOR DISPLAYING EXECUTION SCREEN OF APPLICATION AND METHOD OF CONTROLLING THE SAME

(71) Applicant: Samsung Electronics Co., Ltd., Suwon-si (KR)

(72) Inventors: Seokwon Kim, Suwon-si (KR); Jinseok Kim, Suwon-si (KR); Dami Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/795,334

(22) Filed: Feb. 19, 2020

(65) Prior Publication Data
US 2020/0264773 A1 Aug. 20, 2020

(30) Foreign Application Priority Data

Feb. 19, 2019 (KR) .......................... 10-2019-0019240

(51) Int. Cl.
*G06F 3/041* (2006.01)
*G06F 3/04886* (2022.01)

(52) U.S. Cl.
CPC ........ *G06F 3/04886* (2013.01); *G06F 3/0412* (2013.01)

(58) Field of Classification Search
CPC .......................... G06F 3/04886; G06F 3/0412
See application file for complete search history.

(56) References Cited

U.S. PATENT DOCUMENTS

| 2011/0063325 A1* | 3/2011 | Saunders | .................. G09G 5/00 345/639 |
| 2011/0167380 A1* | 7/2011 | Stallings | .................. G06F 9/451 715/784 |

(Continued)

FOREIGN PATENT DOCUMENTS

| CN | 103677640 A | 3/2014 |
| JP | 2013-126140 A | 6/2013 |

(Continued)

OTHER PUBLICATIONS

International Search Report and Written Opinion of the International Searching Authority in connection with International Application No. PCT/KR2020/002384 dated Jun. 2, 2020, 8 pages.

(Continued)

*Primary Examiner* — Carolyn R Edwards

(57) ABSTRACT

An electronic device includes a display, at least one processor, and a memory. The memory is configured to store instructions that when executed enable the processor to control the display to display an execution screen of application stored in the memory. The instructions also enable the processor to identify an occurrence of an event for displaying an execution screen of the virtual keyboard application while displaying the execution screen of the application. The instructions further enable the processor to, based on the occurrence of the event, identify at least one color value related to the at least one element included in the execution screen of the application, and control the display to display the execution screen of the virtual keyboard application corresponding to the at least one identified color value.

14 Claims, 25 Drawing Sheets

(56) References Cited

U.S. PATENT DOCUMENTS

| | | |
|---|---|---|
| 2013/0154937 A1 | 6/2013 | Park |
| 2015/0067573 A1 | 3/2015 | Seo |
| 2015/0149939 A1* | 5/2015 | Mayblum ......... H04M 1/72448 |
| | | 715/765 |
| 2016/0365021 A1* | 12/2016 | Hancock ................ H04M 1/724 |
| 2017/0205992 A1* | 7/2017 | Paek .................... G06F 3/04845 |
| 2018/0074696 A1* | 3/2018 | Kim ...................... G06F 3/0485 |
| 2019/0079668 A1* | 3/2019 | Rao ..................... G06F 3/04886 |
| 2020/0064993 A1* | 2/2020 | Uebuchi ............. G06F 3/04886 |

FOREIGN PATENT DOCUMENTS

| | | |
|---|---|---|
| KR | 10-2011-0004582 | 1/2011 |
| KR | 10-2011-0129090 A | 12/2011 |
| KR | 10-2016-0101633 A | 8/2016 |

OTHER PUBLICATIONS

Supplementary European Search Report dated Feb. 23, 2022, in connection with European Application No. 20759044.9, 10 pages.
Antonia, "Is Your Phone's Screen At Risk of Burn-In?," Blog, May 21, 2018, 6 pages.

* cited by examiner

ELECTRONIC DEVICE FOR DISPLAYING EXECUTION SCREEN OF APPLICATION AND METHOD OF CONTROLLING THE SAME

CROSS-REFERENCE TO RELATED APPLICATIONS

This application is based on and claims priority under 35 U.S.C. 119 to Korean Patent Application No. 10-2019-0019240, filed on Feb. 19, 2019, in the Korean Intellectual Property Office, the disclosure of which is herein incorporated by reference in its entirety.

BACKGROUND

1. Field

Embodiments of the disclosure relate to electronic devices displaying the execution screen of applications and methods of controlling the same.

2. Description of Related Art

Portable digital communication devices have become must-have items for modern people. Customers desire to receive various high-quality services anytime, anywhere using their portable digital communication devices.

An application is a program running on portable digital communication devices to provide various services. The execution screen of the application is displayed on the display of the portable digital communication device in response to occurrence of an application invocation event.

As various kinds of applications are equipped in a portable digital communication device to provide various high-quality services, a need arises for technology of displaying the execution screen of the applications on the display of the portable digital communication device.

To provide various services (e.g., a text input service), an application (e.g., a virtual keyboard application) may be installed on an electronic device. The electronic device may display the execution screen of the application (e.g., a virtual keyboard application) on the display when an event of invoking the application (e.g., a virtual keyboard application) occurs. However, when the electronic device displays the execution screen of an application along with the execution screen of another application according to an invocation event, screen burn-in may occur due to a difference in color between the respective execution screens of the applications displayed on the display. Further, the similarity in color between the respective execution screens of the applications displayed on the display may render it difficult to visually differentiate between the applications.

The above information is presented as background information only to assist with an understanding of the disclosure. No determination has been made, and no assertion is made, as to whether any of the above might be applicable as prior art with regard to the disclosure.

SUMMARY

According to various embodiments, an electronic device and a method of controlling the electronic device may display the execution screen of an application (e.g., a virtual keyboard application) corresponding to at least one color value of at least one element included in the execution screen of another application being displayed on the display. Thus, the electronic device and method of controlling the same may make the respective execution screens of the applications displayed on the display similar in color to each other, thereby reducing screen burn-in. Further, the electronic device and method of controlling the same may allow the respective execution screens of the applications to be displayed in different colors on the display, thus making the applications more distinctly noticeable.

In accordance with various embodiments, an electronic device comprises a display, at least one processor, and a memory, wherein the memory is configured to store instructions, when executed to, enable the at least one processor to control the display to display an execution screen of application stored in the memory, identify an occurrence of an event for displaying an execution screen of the virtual keyboard application while displaying the execution screen of the application, based on the occurrence of the event, identify at least one color value related to at least one element included in the execution screen of the application, and control the display to display the execution screen of the virtual keyboard application corresponding to the at least one identified color value.

In accordance with various embodiments, a method of controlling an electronic device comprises displaying an execution screen of application on a display of the electronic device, identifying an occurrence of an event for displaying an execution screen of a virtual keyboard application while displaying the execution screen of the application, based on the occurrence of the event, identifying at least one color value related to at least one element included in the execution screen of the application being displayed on the display, and displaying the execution screen of the virtual keyboard application corresponding to the at least one identified color value.

In accordance with various embodiments, an electronic device comprises a display, at least one processor, and a memory, wherein the memory is configured to store instructions, when executed to, enable the at least one processor to control the display to display an execution screen of an application, identify an occurrence of an event for displaying a popup window while displaying the execution screen of the application, based on the occurrence of the event, identify at least one color value related to at least one element included in the execution screen of the application being displayed on the display, and control the display to display a popup window corresponding to the at least one identified color value on the display to cover at least part of the execution screen of the application.

Embodiments of the disclosure are not limited to the foregoing objectives, and other objectives would readily be appreciated by a skilled artisan from the following detailed description taken in conjunction with the accompanying drawings.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

The same or similar reference denotations may be used to refer to the same or similar elements throughout the specification and the drawings.

DETAILED DESCRIPTION

Figure 1:
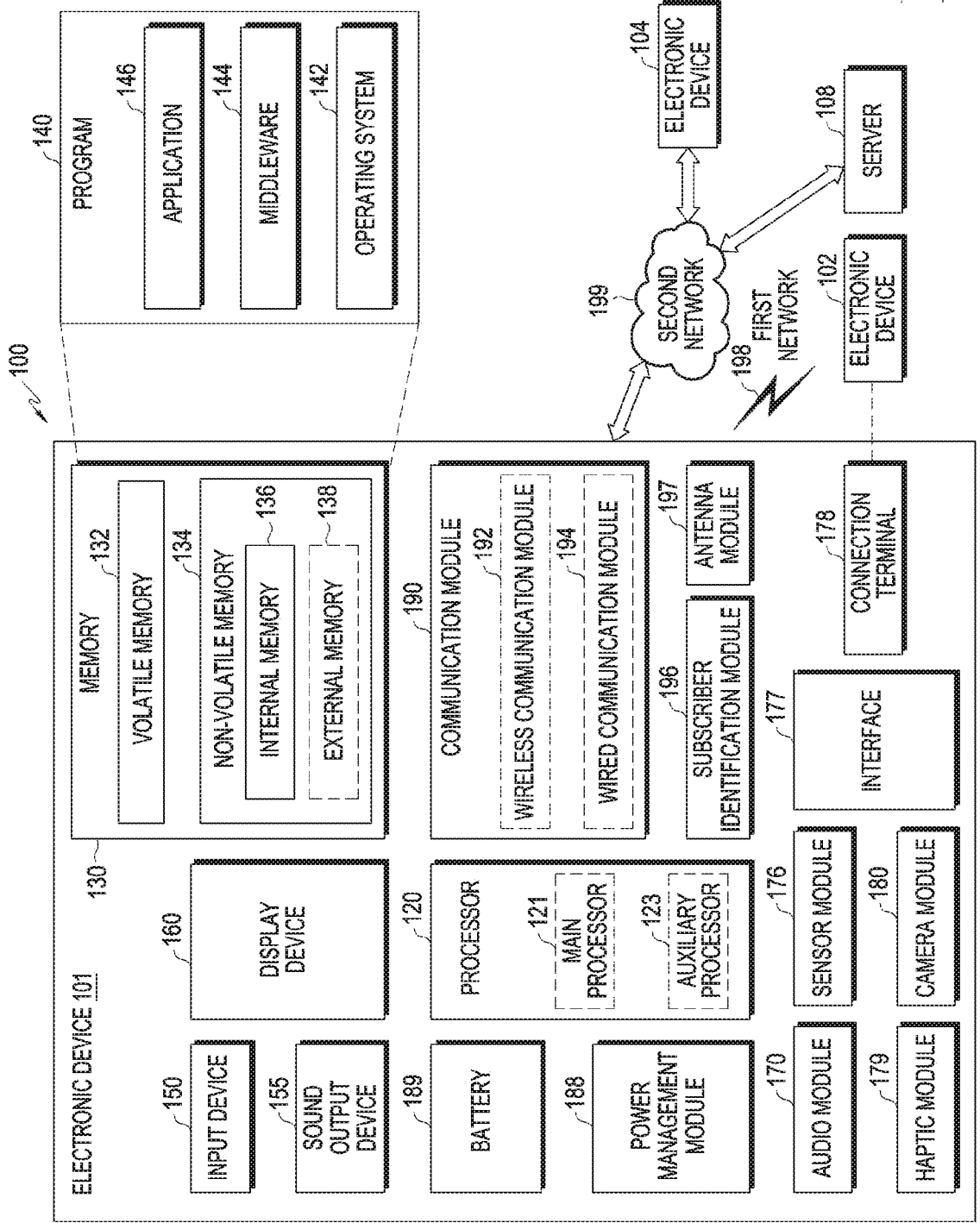
FIG. 1 illustrates a block diagram of an electronic device in a network environment according to an embodiment.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described with reference to the accompanying drawings. However, it should be appreciated that the disclosure is not limited to the embodiments and the terminology used herein, and all changes and/or equivalents or replacements thereto also belong to the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device or external electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the electronic device or external electronic device may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a media box, a gaming console, an electronic dictionary, an electronic key, a camcorder, or an electronic picture frame.

According to an embodiment of the disclosure, the electronic device or external electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device or external electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the electronic device or at least one or more external electronic devices may be flexible or may be a combination of the above-enumerated electronic devices. According to an embodiment of the disclosure, the electronic device or at least one or more external electronic devices are not limited to the above-listed embodiments. As used herein, the term "user" may denote a human or another device using the electronic device or at least one or more external electronic devices (e.g., an artificial intelligent electronic device).

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B. or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, example electronic devices and example methods of controlling the electronic devices are described according to various embodiments.

Although it is described below that the processor 120 controls at least one component of the electronic device 101 to perform the operations of the electronic device 101, embodiments of the disclosure are not limited thereto. For example, instructions or computer code triggering the operations of the electronic device 101 described below may be stored in the memory 130. The stored instructions or computer code may trigger the processor 120 to process the operations using at least one component of the electronic device 101.

Hereinafter, example electronic devices and example methods of controlling the electronic devices are described according to various embodiments. No duplicate description is made below in connection with the operations of the electronic device 101.

According to an embodiment, an electronic device may display the execution screen of a virtual keyboard application based on a theme corresponding to the color of the execution screen of an application being displayed.

Figure 2:
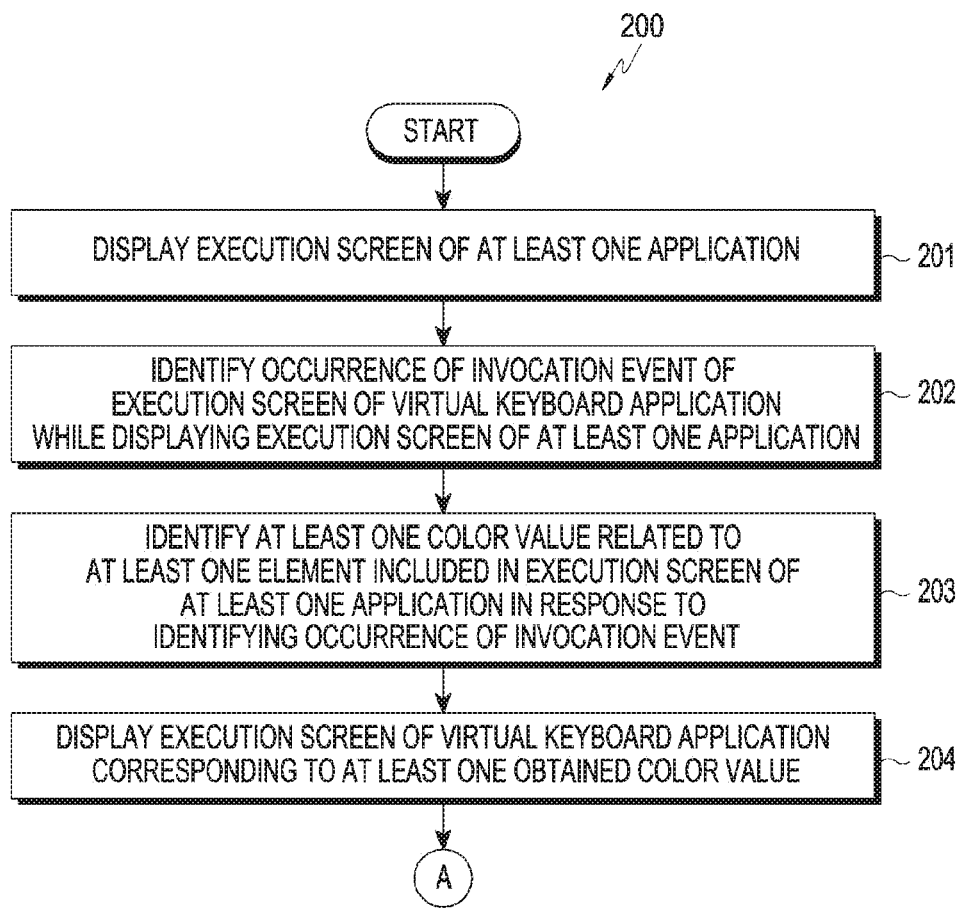
FIG. 2 illustrates a flowchart of an example operation of an electronic device displaying an execution screen of a virtual keyboard application according to an embodiment.

FIG. 2 illustrates a flowchart 200 of an example operation of an electronic device 101 displaying an execution screen of a virtual keyboard application 320 according to an embodiment. According to an embodiment, operations of the electronic device 101 are not limited in order to the operations of the electronic device 101 shown in FIG. 2 and may be performed in a different order than that shown. According to an embodiment, other additional operations than the operations of the electronic device 101 shown in FIG. 2 may be performed or some of the operations of the electronic device 101 shown in FIG. 2 may be omitted. FIG. 2 is described below with reference to FIG. 3.

Figure 3:
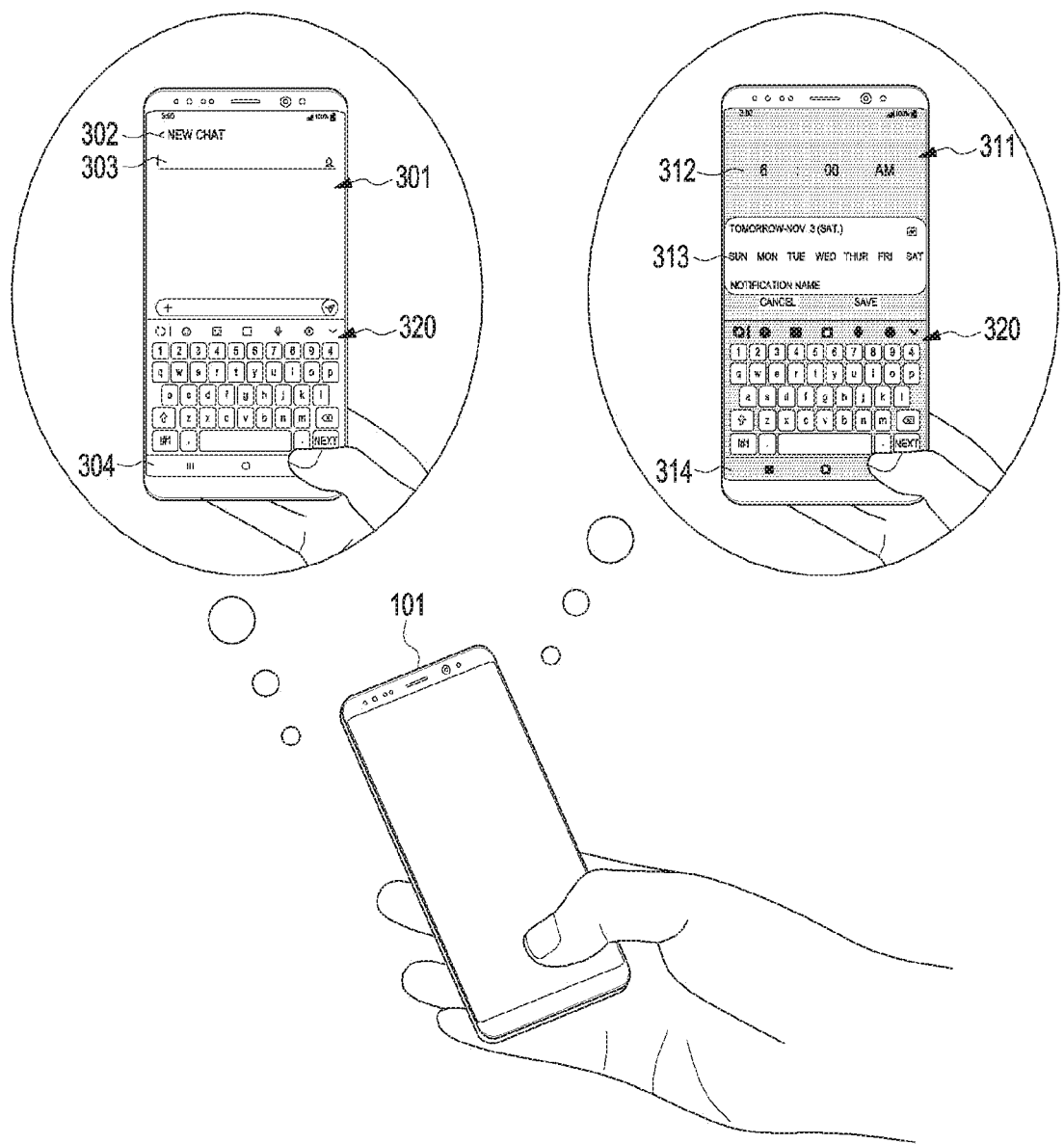
FIG. 3 illustrates a view of an example operation of an electronic device displaying an execution screen of a virtual keyboard application according to an embodiment.

FIG. 3 illustrates a view of an example operation of an electronic device 101 displaying an execution screen of a virtual keyboard application 320 according to an embodiment.

According to an embodiment, an electronic device 101 (e.g., at least one processor 120) may display the execution screen of at least one application, each of which includes at least one element, on the display in operation 201. For example, the electronic device 101 may display an execution screen 301 of a first application including at least one first element 302, 303, and 304 or an execution screen 311 of a second application including at least one second element 312, 313, and 314 as shown in FIG. 3.

According to an embodiment, the memory of the electronic device 101 may be configured to store at least one application including a virtual keyboard application. Each of the at least one application may include an execution screen including at least one element. As used herein, the term "application" may be interchangeably used with the term "application program."

According to an embodiment, at least one element may be at least one graphic object for providing visual information included in the execution screen of the application. Each of the at least one element may be displayed based on at least one color value. The kind of the at least one element is described below in detail with reference to FIGS. 4 and 5.

According to an embodiment, the at least one color value may include at least one of a red-green-blue (RGB) color value, hue-saturation-lightness (HSL) color value, a cyan-magenta-yellow-key (CMYK) color value, a YUV color value, a CIE-LAB color value, or a hue-saturation-value (HSV) color value. However, without being limited thereto, the at least one color value may include various kinds of color model values. The execution screen of the application and the element included in the execution screen of the application may be displayed on the display in a color corresponding to at least one color value based on the at least one color value.

According to an embodiment, the electronic device 101 (e.g., at least one processor 120) may identify the occurrence of an invocation event for the execution screen of the virtual keyboard application 320 while displaying the execution screen of at least one application in operation 202. For example, the electronic device 101 may receive a user input for inputting text (e.g., the user's input of selecting a text input window displayed on the execution screen of the at least one application), and the electronic device 101 may identify the occurrence of the invocation event for the execution screen of the virtual keyboard application 320 in response to the received user input.

According to an embodiment, the electronic device 101 (e.g., at least one processor 120) may identify at least one color value related to at least one element included in the execution screen of the at least one application in response to the occurrence of the invocation event in operation 203. For example, as shown in FIG. 3, the electronic device 101 may identify a first color value (e.g., an RGB value corresponding to gray) related to the at least one first element 302, 303, and 304 (e.g., a first navigation bar) included in the execution screen 301 of the first application and a second color value (e.g., an RGB value corresponding to black) related to the at least one second element 312, 313, and 314 (e.g., a second navigation bar) included in the execution screen 311 of the second application.

According to an embodiment, the electronic device 101 (e.g., at least one processor 120) may control the display to display the execution screen of the virtual keyboard application 320 corresponding to the at least one identified color value in operation 204. Displaying the execution screen of the virtual keyboard application 320 corresponding to the at least one color value may mean displaying the execution screen of the virtual keyboard application 320 based on a theme corresponding to at least part of the at least one color value or displaying the execution screen of the virtual keyboard application 320 in a color corresponding to at least part of the at least one color value.

According to an embodiment, the electronic device 101 (e.g., at least one processor 120) may identify the theme corresponding to at least part of the at least one identified color value and may display the execution screen of the virtual keyboard application 320 on the display based on the identified theme. For example, as shown in FIG. 3, the electronic device 101 may display the execution screen of the virtual keyboard application 320 based on a first theme (e.g., a light theme) corresponding to at least part of at least one first color value (e.g., an RGB value corresponding to gray) related to the at least one first element 302, 303, and 304 or may display the execution screen of the virtual keyboard application 320 based on a second theme (e.g., a dark theme) corresponding to at least part of at least one second color value (e.g., an RGB value corresponding to black) related to the at least one second element 312, 313, and 314. The configuration of identifying a theme and displaying the execution screen of the virtual keyboard application 320 based on the identified theme is merely an example. According to an embodiment, the electronic device 101 may be configured to store information for the correlation between an identified color value range and a plurality of virtual keyboards and to display the virtual keyboard corresponding to the range to which the identified color value belongs. Specifically, the electronic device 101 may store a plurality of virtual keyboards with different properties or attributes (e.g., color, shape, or skin) and may select a virtual keyboard including the property corresponding to at least part of the identified color value from among the plurality of virtual keyboards.

According to an embodiment, the theme may be information for setting a color for at least one element included in the execution screen of the virtual keyboard application 320. The theme may mean information for the graphical user interface (GUI) of the virtual keyboard application 320 or may mean the skin of the execution screen of the virtual keyboard application 320.

According to an embodiment, the at least one theme may include themes of at least one color value. For example, the at least one theme may include themes (e.g., light themes) with a specific color value (e.g., luminance value) more than (or not less than) a preset value or themes (e.g., dark themes) with a specific color value (e.g., luminance value) less than (or not more than) a preset value. However, without limitations thereto, the at least one theme may include various kinds of themes which may be previously stored.

According to an embodiment, the electronic device 101 (e.g., at least one processor 120) may display the execution screen of the virtual keyboard application 320 in the color corresponding to at least part of the at least one identified color value. For example, as shown in FIG. 3, the electronic device 101 may display at least one element (e.g., a virtual keypad) of the execution screen of the virtual keyboard application 320 in a color (e.g., gray) corresponding to at least part of at least one first color value (e.g., an RGB value corresponding to gray) related to the at least one first element 302, 303, and 304, or the electronic device 101 may display at least one element (e.g., a virtual keypad) of the execution screen of the virtual keyboard application 320 in a color (e.g., black) corresponding to at least part of the at least one second color value (e.g., an RGB value corresponding to black) related to the at least one second element 312, 313, and 314.

Hereinafter, another example electronic device and example method of controlling the electronic devices are described according to various embodiments. No duplicate description is made below in connection with the operations of the electronic device 101.

Figure 4:
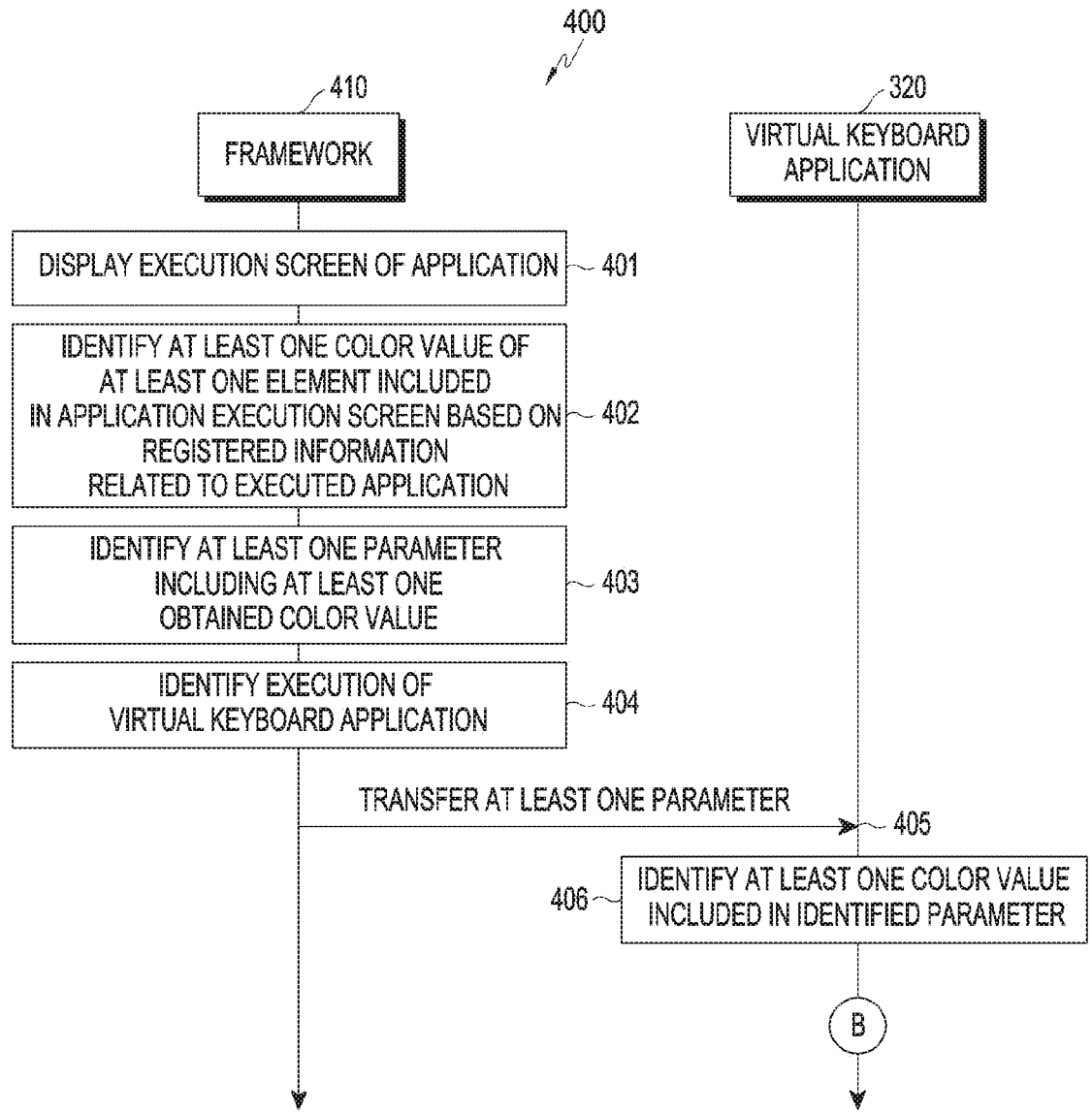
FIG. 4 illustrates a flowchart of example operations of an Android framework and a virtual keyboard application included in an electronic device according to an embodiment.

FIG. 4 illustrates a flowchart 400 of example operations of a framework 410 and a virtual keyboard application 320 included in an electronic device 101 according to an embodiment. According to an embodiment, operations of the electronic device 101 are not limited in order to the operations of the electronic device 101 shown in FIG. 4 and may be performed in a different order than that shown. According to an embodiment, other additional operations than the operations of the electronic device 101 shown in FIG. 4 may be performed or some of the operations of the electronic device 101 shown in FIG. 4 may be omitted. FIG. 4 is described below with reference to FIG. 5.

Figure 5:
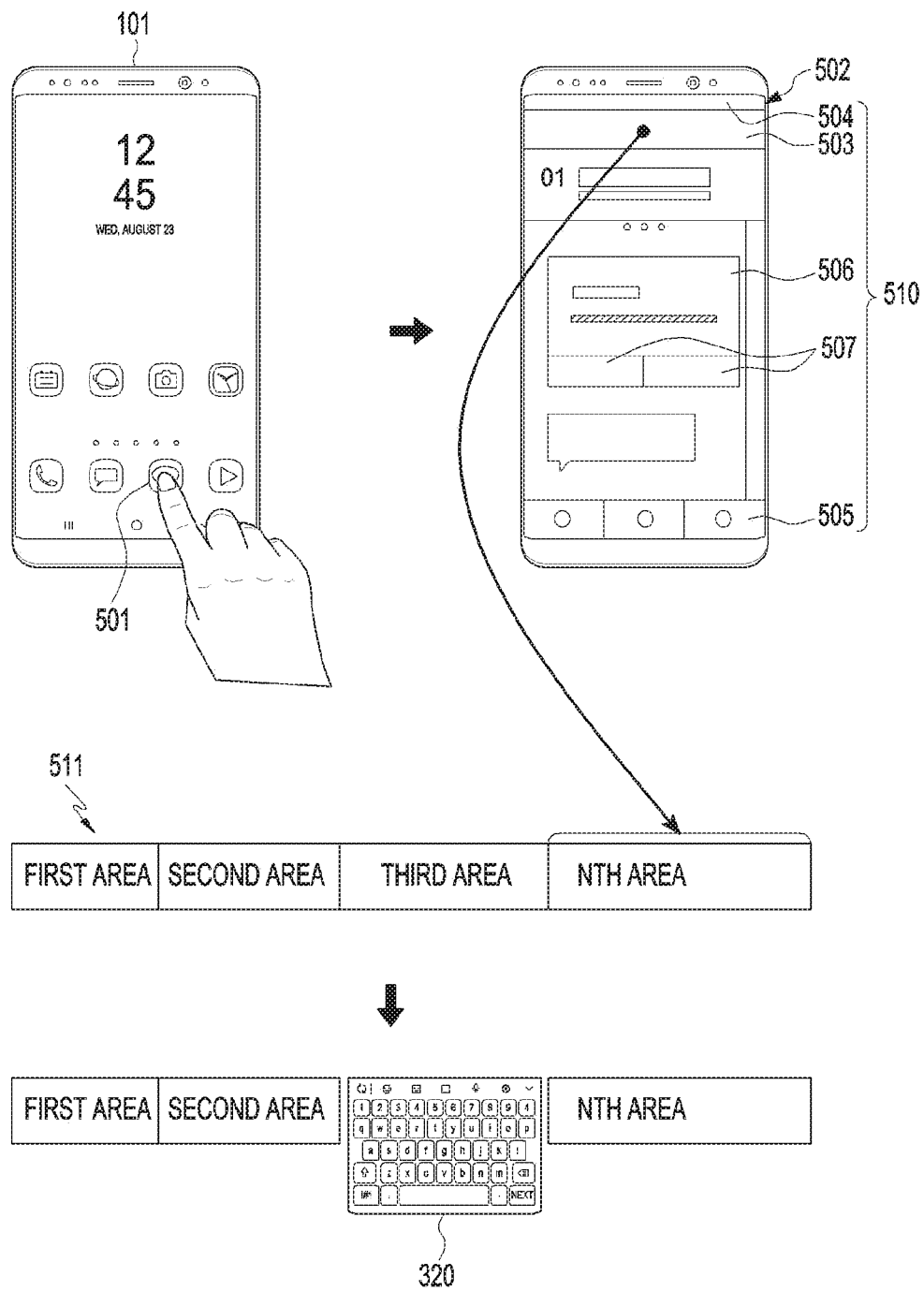
FIG. 5 illustrates a view of example operations of an Android framework and a virtual keyboard application included in an electronic device according to an embodiment.

FIG. 5 illustrates a view of example operations of a framework 410 and a virtual keyboard application 320 included in an electronic device 101 according to an embodiment.

According to an embodiment, as shown in FIG. 4, the electronic device 101 may display the execution screen of the virtual keyboard application 320 based on a parameter 511 transferred from a framework 410 to the virtual keyboard application 320.

According to an embodiment, the framework 410 may perform operations related to a program (e.g., an application) executed on the electronic device 101 and may provide information related to the program to another application (e.g., the virtual keyboard application 320). For example, the framework 410 may identify information related to the executed application and identify an invocation event for the program. For example, the framework 410 may transfer the information related to the application executed on the electronic device 101 to the virtual keyboard application 320 in response to execution of the virtual keyboard application 320.

According to an embodiment, the virtual keyboard application 320 may be a program for inputting text. For example, the virtual keyboard application 320 may include a soft keyboard program, a touch keyboard program, or an image keyboard program.

Described below are operations of the framework 410 and the virtual keyboard application 320. The operations of the framework 410 and the virtual keyboard application 320 may be interpreted as operations of the electronic device 101.

According to an embodiment, the framework 410 (e.g., at least one processor 120) may enable the execution screen of the application to be displayed in operation 401. As shown in FIG. 5, the framework 410 may execute an application 501 requested to be invoked in response to an application execution invocation event (e.g., receiving the user's input for executing the application 501) and may display the execution screen 502 of the executed application. The framework 410 may switch the execution screen in display to a first execution screen in response to an event (e.g., a user input for switching to the first execution screen) of invoking the first execution screen while displaying the execution screen 502 of the application.

According to an embodiment, the application execution screen 502 may include various kinds of, at least one, element 510 as shown in FIG. 5. The at least one element 510 of various kinds may include at least one of a navigation bar 503, a status bar 504, a tab bar 505, a popup window 506, and various kinds of objects (e.g., checkboxes, buttons, or indexes) 507. Without being limited to what is shown in FIG. 5, the at least one element 510 may include various graphic objects included in the application execution screen 502.

According to an embodiment, the framework 410 (e.g., at least one processor 120) may display the application execution screen 502 including at least one element 510 with a color corresponding to at least one designated color value upon displaying the application execution screen 502.

According to an embodiment, the framework 410 (e.g., at least one processor 120) may store, register, and/or manage information related to the application upon executing the application. For example, the information indicating at least one color value related to each of at least one element 510 included in the application execution screen 502 may be stored, registered, and/or managed by the framework 410.

According to an embodiment, the framework 410 (e.g., at least one processor 120) may identify at least one color value related to at least one element 510 included in the application execution screen 502 based on registered information related to the executed application in operation 402. For example, the framework 410 may identify and refer to at least one color value (e.g., an RGB value) related to at least one element 510 included in the application execution screen 502 being displayed on the display among at least one color value related to at least one element 510 stored, registered, and/or managed by each of the plurality of applications being executed on the electronic device 101.

According to an embodiment, the application execution screen 502 being displayed on the electronic device 101 may be the application execution screen 502 displayed at the top level among the plurality of applications being executed on the electronic device 101. The application execution screen 502 being displayed on the electronic device 101 may be the execution screen 502 executed in a foreground running mode among the plurality of applications being executed on the electronic device 101.

According to an embodiment, the framework 410 (e.g., at least one processor 120) may identify at least one color value related to a specific element (e.g., a navigation bar) among at least one element 510 included in the execution screen 502 of at least one application. However, without being limited thereto, the framework 410 (e.g., at least one processor 120) may identify at least one color value related to each of the at least one element 510 or may identify at least one color value related to each of at least some of the at least one element 510.

According to an embodiment, the framework 410 (e.g., at least one processor 120) may identify at least one parameter 511 including at least one obtained color value in operation 403. As shown in FIG. 5, the framework 410 may identify at least one parameter 511 including various kinds of information related to the application displayed on the display. At least one parameter 511 may include a first area to an Nth area as shown in FIG. 5. At least one of the first to Nth areas may include at least one identified color value, and the other areas may include various kinds of information (e.g., information related to the current execution state of the application and application meta data) related to the application. For example, the parameter 511 may be an object (or class, e.g., Editorinfo) for the framework 410 to transfer at least one color value and various kinds of information to the virtual keyboard application 320. According to an embodiment, the information related to the current execution state of the application may be information indicating the amount, color, or kind of the content (e.g., text, image or video) displayed on the execution screen 502 of the application. According to an embodiment, the application meta data may include information for describing the application, e.g., information related to the title, summary, or keywords of the application.

According to an embodiment, in response to identifying the execution of the virtual keyboard application 320 in operation 404, the framework 410 (e.g., at least one processor 120) may transfer at least one parameter 511 to the virtual keyboard application 320 in operation 405. As shown in FIG. 5, the framework 410 may transfer the parameter 511 to be used for executing the virtual keyboard application 320, and the virtual keyboard application 320 may be executed based on the received parameter 511.

According to an embodiment, without being limited thereto, the framework 410 may transfer at least one parameter 511 to the virtual keyboard application 320 at a specific time or in real-time.

According to an embodiment, the framework 410 (e.g., at least one processor 120) may transfer at least one parameter 511 to the virtual keyboard application 320 at a specific time. For example, the framework 410 may transfer at least one parameter 511 to the virtual keyboard application 320 at the time of identifying an invocation event (e.g., receiving a user input for executing the virtual keyboard application 320) for the virtual keyboard application 320. For example, the framework 410 may transfer at least one parameter 511 to the virtual keyboard application 320 at the time that the execution screen 502 of at least one application being displayed is displayed as a first execution screen. As an example, the framework 410 may transfer at least one parameter 511 to the virtual keyboard application 320 at the time when the execution screen 502 of at least one application switches from the first execution screen including at least one first element to a second execution screen including at least one second element under the control of the user. For example, the framework 410 may transfer at least one parameter 511 to the virtual keyboard application 320 at the time when the execution screen 502 of the application being displayed on the display switches from the execution screen 502 of the first application to the execution screen 502 of the second application which is different from the first application.

According to an embodiment, without being limited thereto, the framework 410 (e.g., at least one processor 120) may transfer at least one parameter 511 to the virtual keyboard application 320 as at least part of operation 402, 403, or 404.

According to an embodiment, the framework 410 (e.g., at least one processor 120) may transfer at least one parameter 511 to the virtual keyboard application 320 in real-time (e.g., at designated time intervals). The framework 410 may sequentially transfer at least one parameter 511 identified at designated time intervals to the virtual keyboard application 320 while the execution screen 502 of at least one application is displayed on the display.

According to an embodiment, the virtual keyboard application 320 (e.g., at least one processor 120) may identify at least one color value included in at least one parameter 511 in operation 406. The virtual keyboard application 320 may also identify various kinds of information (e.g., current execution state information for the application and application meta data) related to the application included in at least one parameter 511 along with at least one color value included in at least one parameter 511.

Hereinafter, another example electronic device 101 and example method of controlling the electronic devices are described according to various embodiments. No duplicate description is made below in connection with the operations of the electronic device 101.

Figure 6:
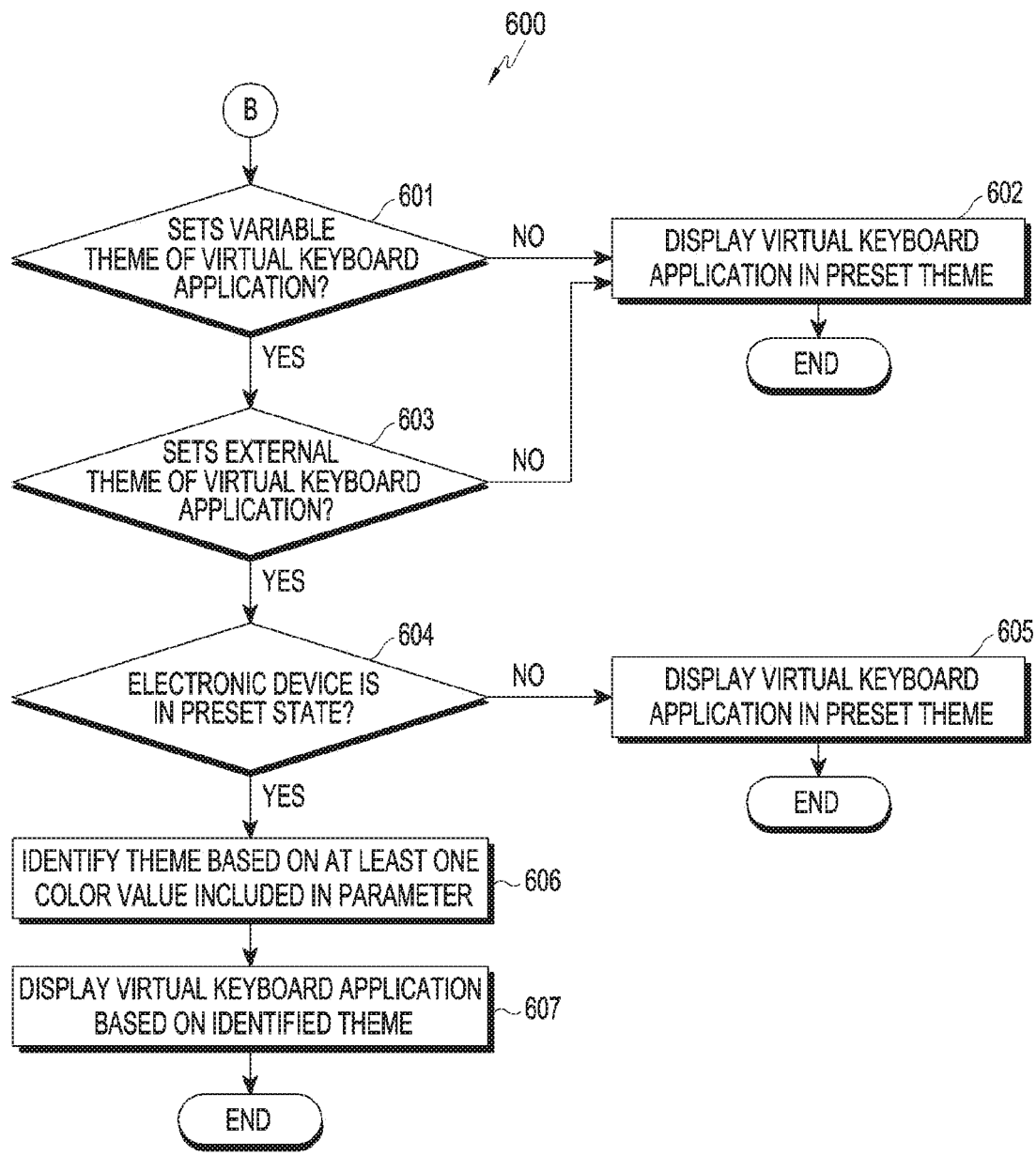
FIG. 6 illustrates a flowchart of example operations of an electronic device according to an embodiment.

FIG. 6 illustrates a flowchart 600 of example operations of an electronic device 101 according to an embodiment. According to an embodiment, operations of the electronic device 101 are not limited in order to the operations of the electronic device 101 shown in FIG. 6 and may be performed in a different order than that shown. According to an embodiment, other additional operations than the operations of the electronic device 101 shown in FIG. 6 may be performed or some of the operations of the electronic device 101 shown in FIG. 6 may be omitted. FIG. 6 is described below with reference to FIG. 7.

Figure 7:
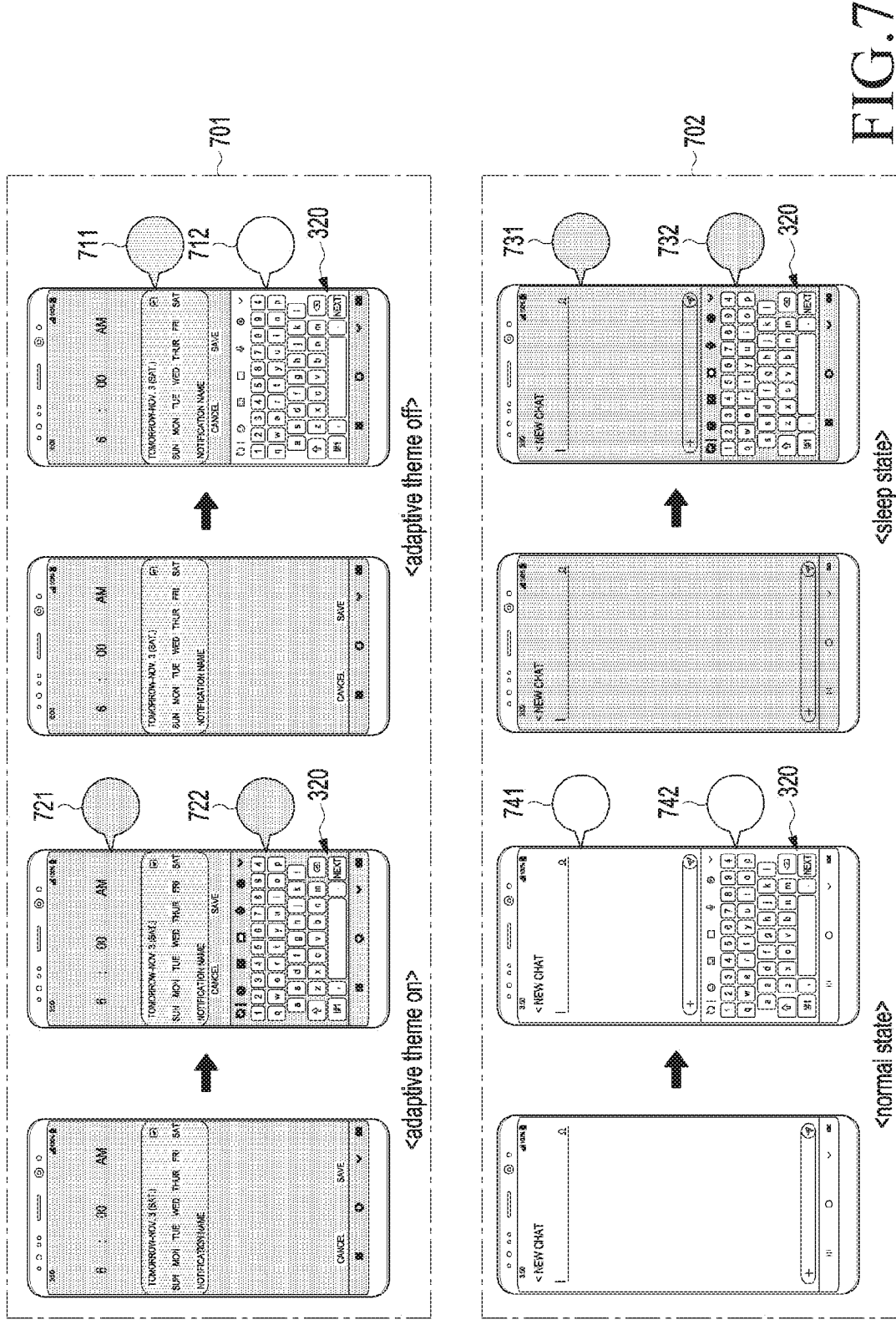
FIG. 7 illustrates a view of example operations of an electronic device according to an embodiment.

FIG. 7 illustrates a view of example operations of an electronic device 101 according to an embodiment.

According to an embodiment, an electronic device 101 (e.g., at least one processor 120) may identify a variable theme setting state of the virtual keyboard application 320 in operation 601. The variable theme setting state may include a variable theme active state (also referred to as "adaptive theme on state") indicating a state of having been set to display the virtual keyboard application 320 corresponding to at least one identified color value and a variable theme inactive state (also referred to as "adaptive theme off state") indicating a state of having been set to display the virtual keyboard application 320 based on a preset theme (or skin).

According to an embodiment, when the variable theme setting state is the variable theme inactive state, the electronic device 101 (e.g., at least one processor 120) may control the display to display the execution screen of the virtual keyboard application 320 in a preset theme in operation 602. For example, when the variable theme setting state is the variable theme inactive state as shown in 701 of FIG. 7, the electronic device 101 may display the execution screen of the virtual keyboard application 320 based on the preset theme (e.g., a light theme) 712 regardless of the color (e.g., black) 711 of at least one element included in the execution screen of the at least one application. Upon identifying that the variable theme setting state is the variable theme active state, the electronic device may perform operation 603.

According to an embodiment, the electronic device 101 (e.g., at least one processor 120) may identify whether an external theme of the virtual keyboard application is set in operation 603. In response to identifying that the variable theme setting state of the virtual keyboard application is the variable theme active state, the electronic device may identify a preset external theme for the virtual keyboard application. Upon identifying that an external theme is preset for the virtual keyboard application, the electronic device may display the virtual keyboard application in the preset theme (e.g., the external theme) as in operation 602. Upon identifying that no external theme is set for the virtual keyboard application, the electronic device may perform operation 604. According to an embodiment, the external theme may mean a property (e.g., color, shape, or skin) set on the virtual keyboard application by the user. The external theme may be obtained by the user editing the property on his or her own or may be obtained from an external device (e.g., a server) storing the external theme.

According to an embodiment, the electronic device 101 (e.g., at least one processor 120) may identify whether the state of the electronic device 101 is a preset state in operation 604. The state of the electronic device 101 may include at least one of a power consumption state (e.g., sleep state or normal state), resource allocation state, power charging amount (e.g., battery charging amount) state, or display brightness level (or step).

According to an embodiment, when the state of the electronic device 101 is the preset state, the electronic device 101 (e.g., at least one processor 120) may control the display to display the execution screen of the virtual keyboard application 320 in a predesignated theme. In other words, although the variable theme setting state is the variable theme active state, the electronic device 101 may set the execution screen of the virtual keyboard application 320 to the theme and/or color corresponding to the preset state of the electronic device 101 but rather than setting the theme and/or color of the virtual keyboard application 320 based on at least one color value related to at least one element included in the application execution screen being displayed.

According to an embodiment, a theme corresponding to the state of the electronic device 101 may be predesignated for the execution screen of the virtual keyboard application 320. Thus, when the state of the electronic device 101 is the preset state, the electronic device 101 may display the execution screen of the virtual keyboard application 320 in the predesignated theme corresponding to the preset state. Making such a setting as to display the execution screen of the virtual keyboard application 320 in the predesignated theme corresponding to the state of the electronic device 101 being the preset state may be defined as a policy of the electronic device 101.

For example, as shown in 702 of FIG. 7, if the power consumption state is the normal state, a light theme 742 may be predesignated for the execution screen of the virtual keyboard application 320 and, if the power consumption state is the sleep state, a dark theme 732 may be predesignated for the execution screen of the virtual keyboard application 320.

According to an embodiment, the electronic device 101 (e.g., at least one processor 120) may identify the theme based on at least part of at least one color value included in the parameter in operation 606 and may control the display to display the execution screen of the virtual keyboard application 320 based on the identified theme in operation 607. For example, the electronic device 101 may identify the mean value of at least one color value and identify a specific color value (e.g., a luminance value) based on the identified mean value. The electronic device 101 may identify the theme corresponding to the identified luminance value among at least one theme. When the virtual keyboard application 320 is executed, the electronic device 101 may apply the identified theme to the virtual keyboard application 320 and display the element (e.g., a keypad) included in the execution screen of the virtual keyboard application 320 based on the identified theme.

According to an embodiment, the specific color value is not limited thereto but may rather be a color value other than illuminance, which may be calculated based on at least part of at least one color value.

According to an embodiment, the electronic device 101 (e.g., at least one processor 120) may display the execution screen of the virtual keyboard application 320 corresponding to at least one color value included in the parameter instead of performing operations 606 and 607. For example, the electronic device 101 may set a color of at least one element (e.g., a keypad) included in the virtual keyboard application 320 based on at least part of the at least one identified color value.

According to an embodiment, in response to identifying in operation 601 that the variable theme setting state is the variable theme active state, the electronic device 101 (e.g., at least one processor 120) may immediately perform operations 606 and 607 without performing at least one of operation 603 or 604. For example, the electronic device 101 may only identify whether the variable theme setting of the virtual keyboard application 320 is active and may control the display to display the execution screen of the virtual keyboard application 320 in the color 722 corresponding to at least part of at least one color value 721 related to at least one element included in the execution screen of at least one application being displayed in response to identifying that the variable theme setting of the virtual keyboard application 320 is the variable theme active state (active theme on) as shown in FIG. 7.

Example operations of displaying the execution screen of the virtual keyboard application 320 of the electronic device 101 are described below according to various embodiments.

Figure 8:
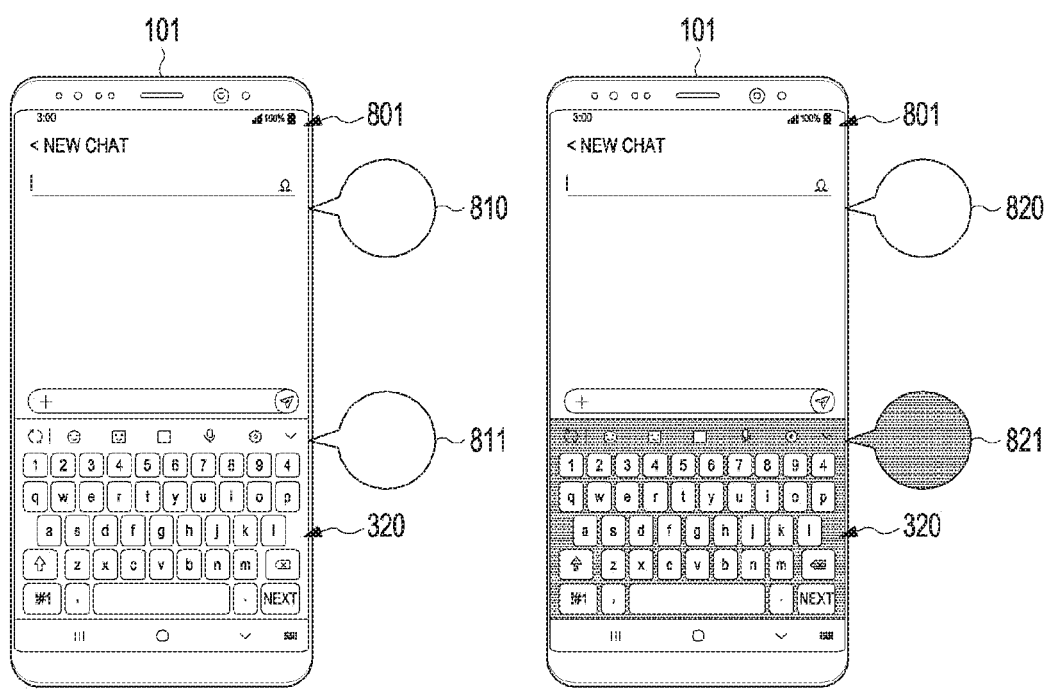
FIG. 8 illustrates a view of an example operation of displaying an execution screen of a virtual keyboard application of an electronic device according to an embodiment.

FIG. 8 illustrates a view of an example operation of an electronic device 101 displaying an execution screen of a virtual keyboard application 320 according to an embodiment.

According to an embodiment, as shown in FIG. 8, the electronic device 101 may display the virtual keyboard application 320 in a color 811 similar to the color 810 of the execution screen 801 of at least one application.

For example, the electronic device 101 (e.g., at least one processor 120) may identify a theme with a similar color to at least one color value among at least one theme stored in the memory. As an example, if a specific color value (e.g., an luminance value) identified based on at least one color value is not less than (or more than) a preset value, the electronic device 101 may identify a first theme (e.g., a light theme) with a high specific color value (e.g., a luminance value) and, if the specific color value (e.g., a luminance value) identified based on at least one color value is less than (or not more than) the preset value, the electronic device 101 may identify a second theme (e.g., a dark theme) with a low specific color value (e.g., a luminance value).

For example, the electronic device 101 (e.g., at least one processor 120) may set a color of at least one element (e.g., a keypad) included in the virtual keyboard application 320 based on the mean value of the at least one identified color value.

According to an embodiment, the electronic device 101 (e.g., at least one processor 120) may display in a color 821 (e.g., the complementary color) different from the color 820 of the execution screen 801 of at least one application as shown in FIG. 8.

For example, the electronic device 101 (e.g., at least one processor 120) may identify a theme with a different color from at least one color value among at least one theme stored in the memory. As an example, if a specific color value (e.g., an luminance value) identified based on at least one color value is not less than (or more than) a preset value, the electronic device 101 may identify a first theme (e.g., a dark theme) with a low specific color value (e.g., a luminance value) and, if the specific color value (e.g., a luminance value) identified based on at least one color value is less than (or not more than) the preset value, the electronic device 101 may identify a second theme (e.g., a light theme) with a high specific color value (e.g., a luminance value).

For example, the electronic device 101 (e.g., at least one processor 120) may identify a color (e.g., the complementary color) different from at least one color value based on the mean value of at least one identified color value and set a color of at least one element (e.g., a keypad) included in the virtual keyboard application 320 to the identified complementary color.

Figure 9:
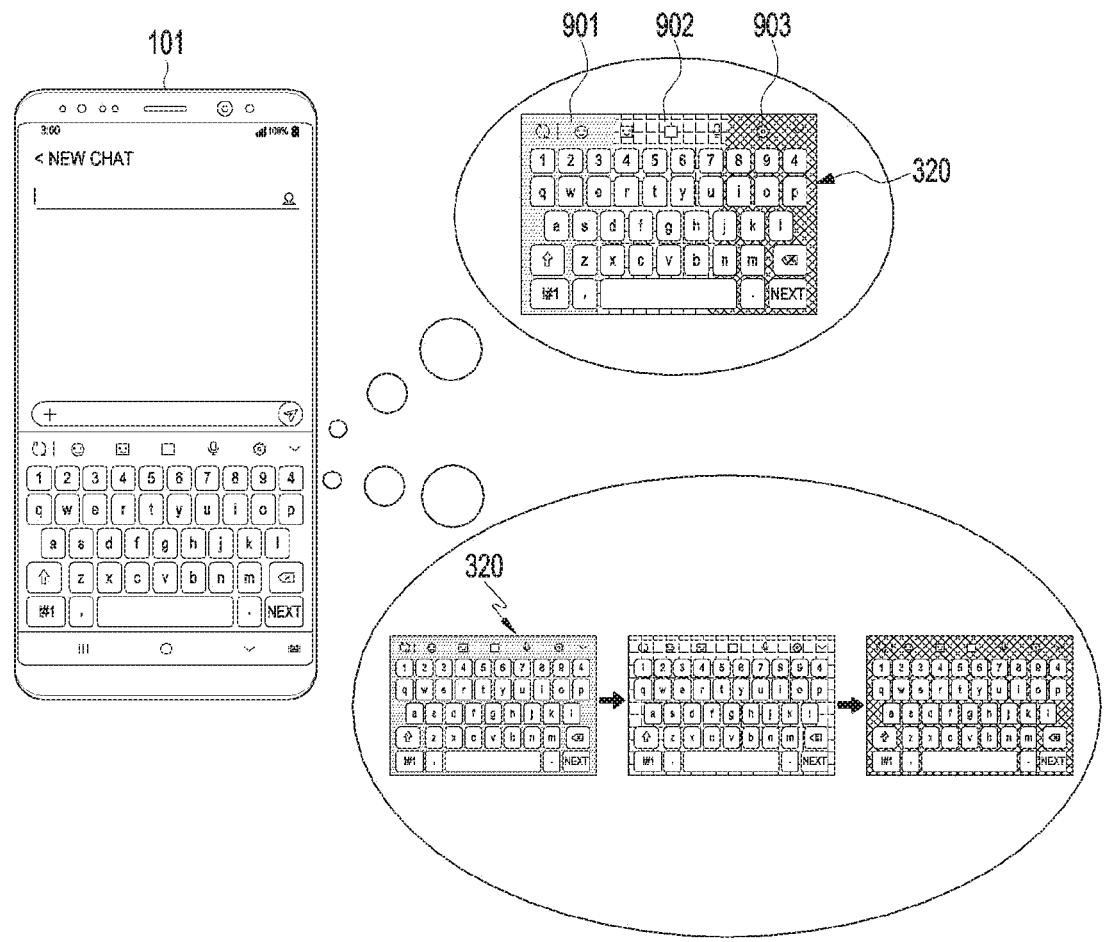
FIG. 9 illustrates a view of another example operation of displaying an execution screen of a virtual keyboard application of an electronic device according to an embodiment.

FIG. 9 illustrates a view of an example operation of an electronic device 101 displaying an execution screen of a virtual keyboard application 320 according to an embodiment.

According to an embodiment, the electronic device 101 (e.g., at least one processor 120) may display an execution screen of the virtual keyboard application 320 with areas 901, 902, and 903 displayed in different colors (e.g., gradations) as shown in FIG. 9.

For example, the electronic device 101 (e.g., at least one processor 120) may identify a theme in which each of at least one identified color value is displayed per area in the execution screen of the virtual keyboard application 320 and may display the execution screen of the virtual keyboard application 320 based on the identified theme.

As another example, the electronic device 101 (e.g., at least one processor 120) may display in the color corresponding to each of at least one color value identified per area in the execution screen of the virtual keyboard application 320.

According to an embodiment, the electronic device 101 (e.g., at least one processor 120) may sequentially display the execution screen of the virtual keyboard application 320 displayed in various colors as shown in FIG. 9.

For example, the electronic device 101 (e.g., at least one processor 120) may identify the theme in which the color corresponding to each of at least one identified color value is sequentially displayed over time and display the execution screen of the virtual keyboard application 320 based on the identified theme.

For example, the electronic device 101 (e.g., at least one processor 120) may display the execution screen of the virtual keyboard application 320 in the color corresponding to each of the at least one identified color value identified sequentially over time.

Hereinafter, another example electronic device 101 and example method of controlling the electronic devices are described according to various embodiments.

According to an embodiment, the electronic device 101 may identify various kinds of information (e.g., application execution state) related to an application along with at least one color value related to an element included in the execution screen of the application, and the electronic device 101 may display the execution screen of the virtual keyboard application 320 based on the at least one color value and various kinds of information identified.

Figure 10:
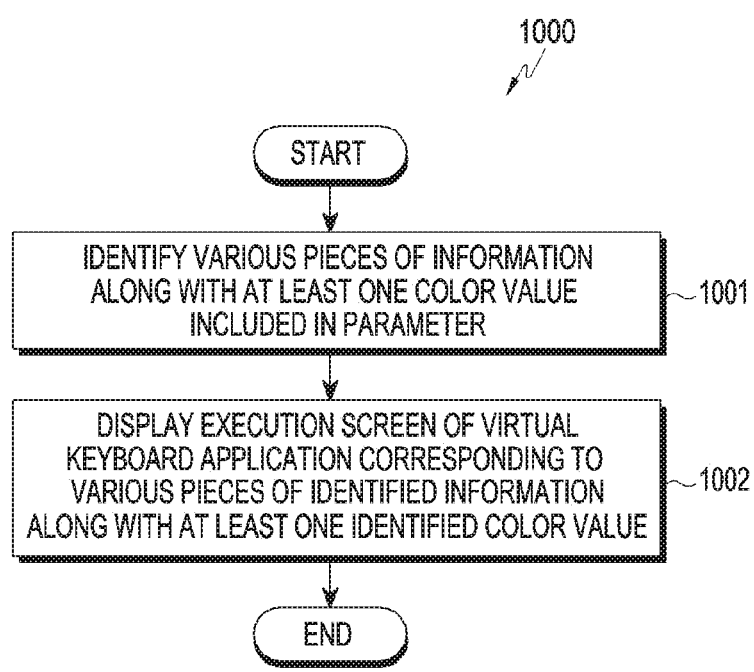
FIG. 10 illustrates a flowchart of an example operation of displaying an execution screen of a virtual keyboard application based on at least one color value and various kinds of information of an electronic device according to an embodiment.

FIG. 10 illustrates a flowchart 1000 of an example operation of displaying an execution screen of a virtual keyboard application 320 based on at least one color value and various kinds of information of an electronic device 101 according to an embodiment. According to an embodiment, operations of the electronic device 101 are not limited in order to the operations of the electronic device 101 shown in FIG. 10 and may be performed in a different order than that shown. According to an embodiment, other additional operations than the operations of the electronic device 101 shown in FIG. 10 may be performed or some of the operations of the electronic device 101 shown in FIG. 10 may be omitted.

Figure 11:
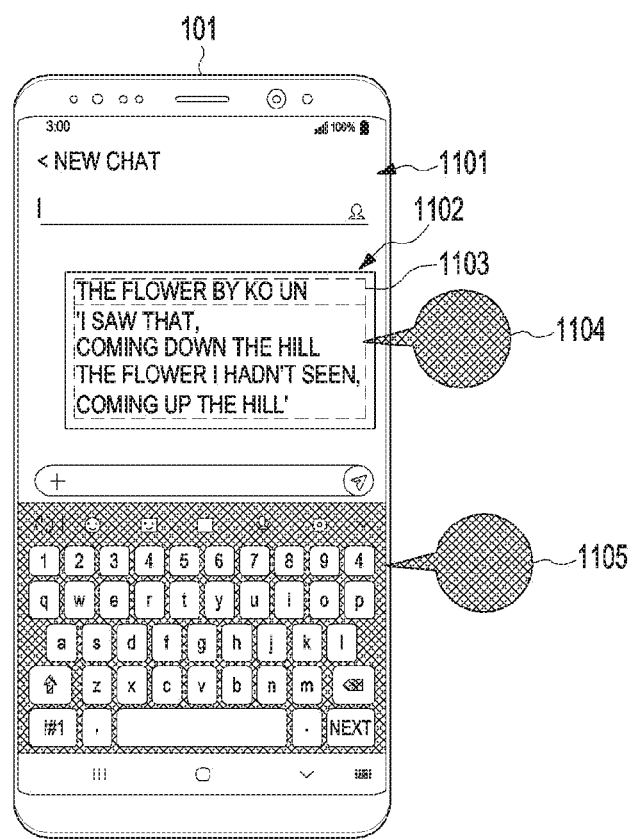
FIG. 11 illustrates a view of an example operation of displaying an execution screen of a virtual keyboard application based on at least one color value and various kinds of information of an electronic device according to an embodiment.

FIG. 11 illustrates a view of an example operation of displaying an execution screen of a virtual keyboard application 320 based on at least one color value and various kinds of information of an electronic device 101 according to an embodiment.

According to an embodiment, the electronic device 101 (e.g., at least one processor 120) may identify various kinds of information along with at least one color value included in a parameter in operation 1001. For example, the electronic device 101 may identify information related to the current execution state of the application and application meta data included in the parameter along with at least one color value included in the parameter 511. As an example, the electronic device 101 may identify information (e.g., the amount 1103 of content or the color 1104 of the content) related to the content 1102 included in the application execution screen 1101 based on various kinds of information as shown in FIG. 11.

According to an embodiment, the electronic device 101 (e.g., at least one processor 120) may control the display to display the execution screen of the virtual keyboard application 320 corresponding to the at least one identified color value and various kinds of identified information in operation 1002.

For example, the electronic device 101 (e.g., at least one processor 120) may identify the application information (e.g., application kind information) based on the identified application meta data and apply the identified application information along with at least part of the at least one identified color value, thereby displaying the execution screen of the virtual keyboard application 320. As an example, the electronic device 101 may identify a color (e.g., red) related to the identified application kind information (e.g., emergency call application) and may display the execution screen of the virtual keyboard application 320 in a color (e.g., a similar color or a different color) corresponding, in at least part of at least one color value, to the related color.

As an example, the electronic device 101 (e.g., at least one processor 120) may identify the current execution state of the application based on various kinds of identified information and apply the identified current execution state of the application along with at least part of the at least one element color value, thereby displaying the execution screen of the virtual keyboard application 320. As an example, as shown in FIG. 11, the electronic device 101 may apply information for content 1102 (e.g., the color 1104 of the content) included in the identified current execution screen 1101 of the application, thereby displaying the execution screen of the virtual keyboard application 320 in a color 1105 corresponding to the color 1104 of the content and at least part of the at least one color value.

Hereinafter, another example electronic device 101 and example method of controlling the electronic device are described according to various embodiments. No duplicate description is made below in connection with the operations of the electronic device 101.

According to an embodiment, the electronic device 101 may dynamically switch themes and/or color values for the execution screen of the virtual keyboard application 320 based on a switch of the execution screen of the application being displayed on the display.

Figure 12:
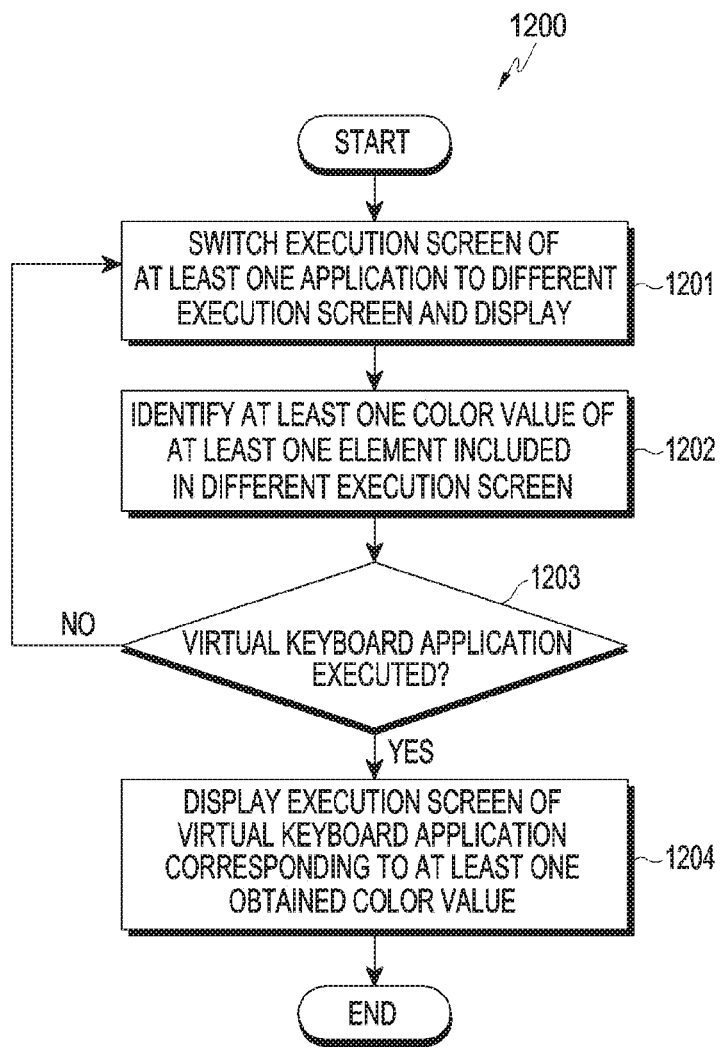
FIG. 12 illustrates a flowchart of an example operation of changing themes and/or color values of an execution screen of a virtual keyboard application of an electronic device according to an embodiment.

FIG. 12 illustrates a flowchart 1200 of an example operation of changing themes and/or color values of an execution screen of a virtual keyboard application 320 of an electronic device 101 according to an embodiment. According to an embodiment, operations of the electronic device 101 are not limited in order to the operations of the electronic device 101 shown in FIG. 12 and may be performed in a different order than that shown. According to an embodiment, other additional operations than the operations of the electronic device 101 shown in FIG. 12 may be performed or some of the operations of the electronic device 101 shown in FIG. 12 may be omitted.

Figure 13:
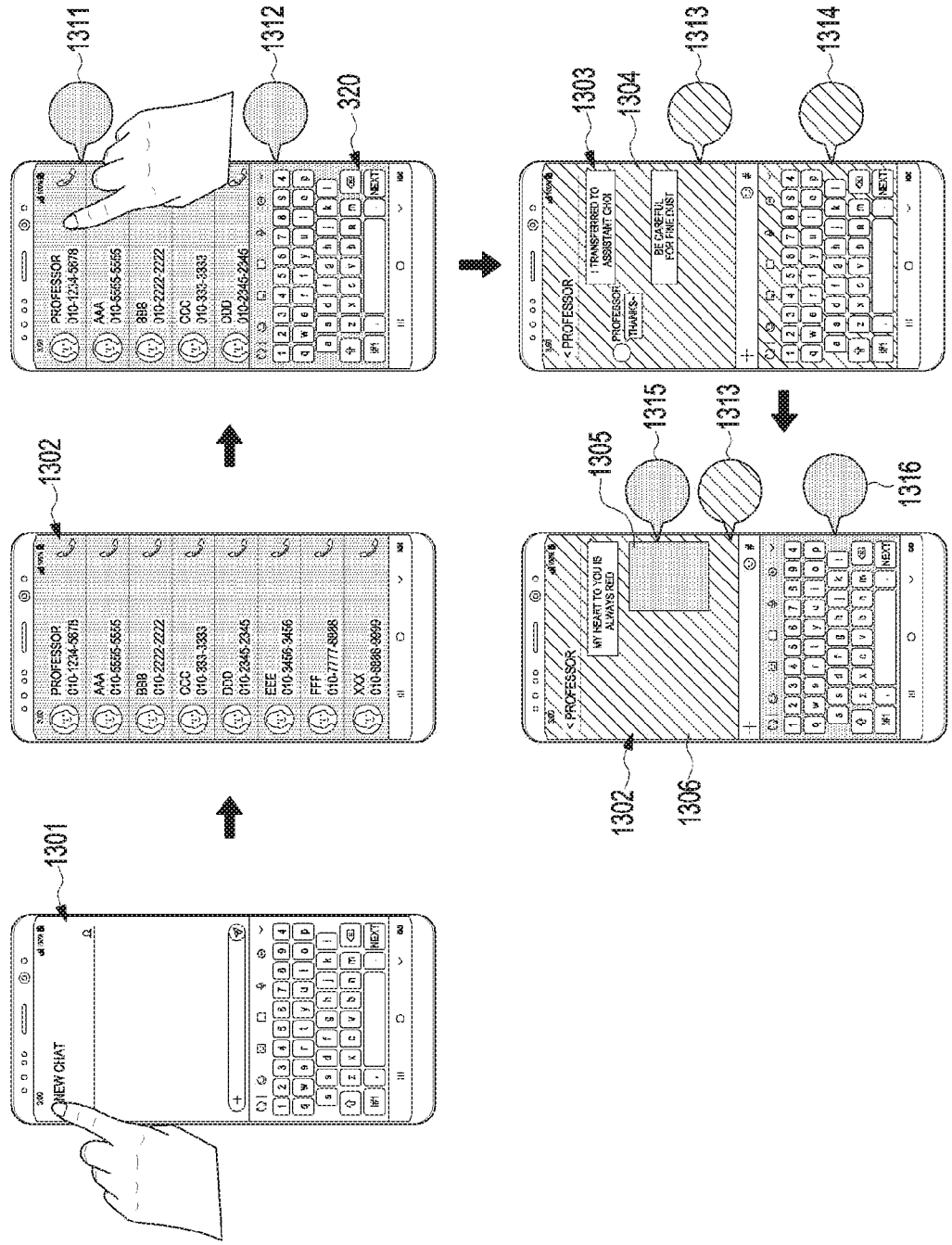
FIG. 13 illustrates a view of an example operation of changing themes and/or color values of an execution screen of a virtual keyboard application according to an embodiment.
Figure 14:
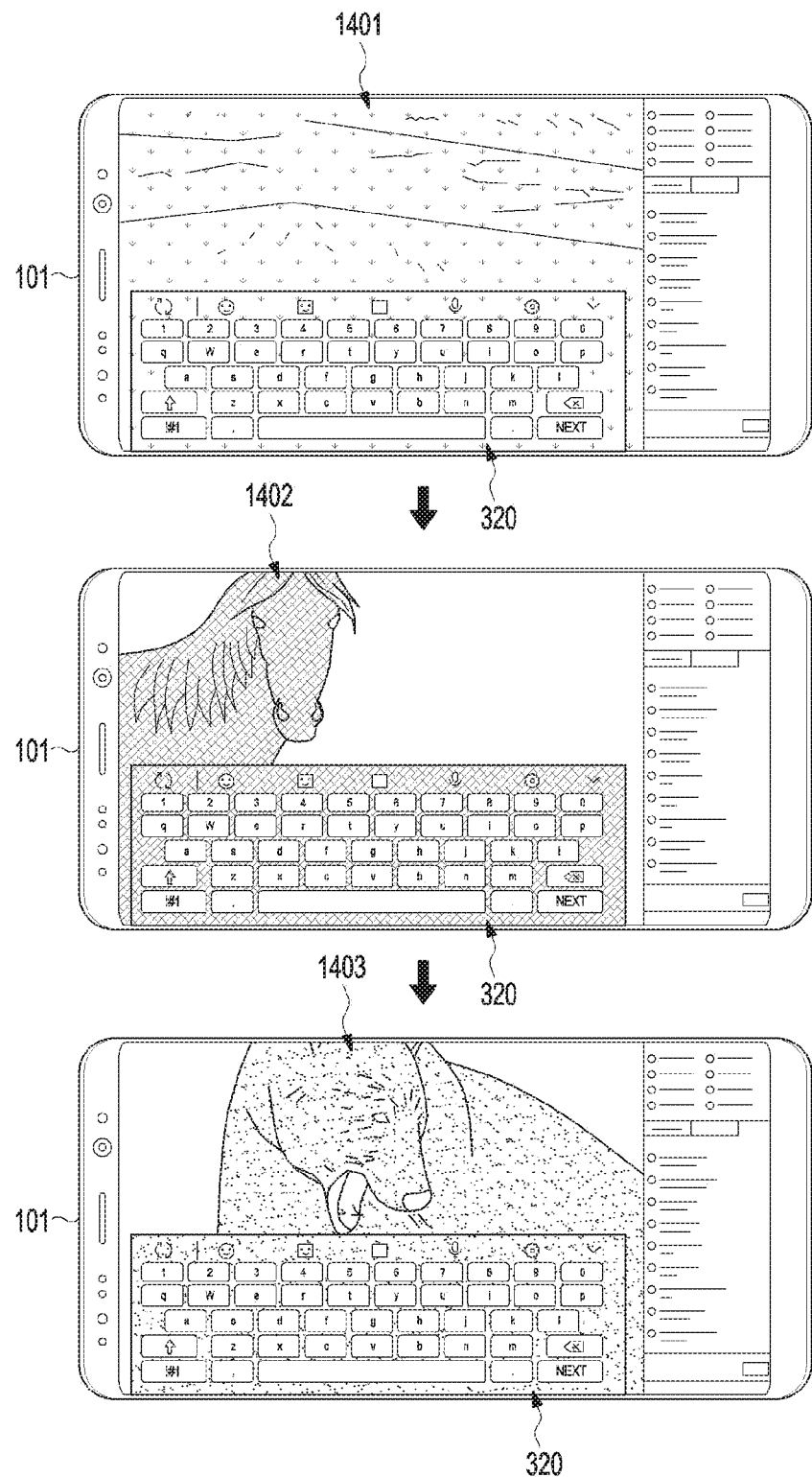
FIG. 14 illustrates a view of another example operation of changing themes and/or color values of an execution screen of a virtual keyboard application according to an embodiment.
Figure 15:
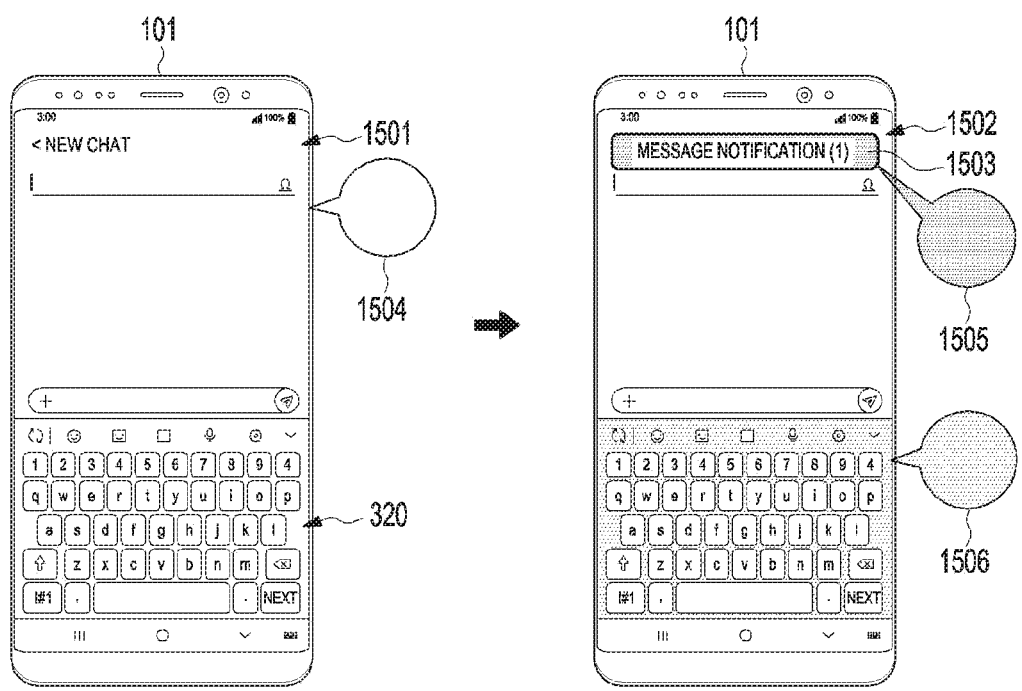
FIG. 15 illustrates a view of another example operation of changing themes and/or color values of an execution screen of a virtual keyboard application according to an embodiment.

FIG. 13 illustrates a view of an example operation of changing themes and/or color values of an execution screen of a virtual keyboard application 320 according to an embodiment. FIG. 14 illustrates a view of another example operation of changing themes and/or color values of an execution screen of a virtual keyboard application 320 according to an embodiment. FIG. 15 illustrates a view of another example operation of changing themes and/or color values of an execution screen of a virtual keyboard application 320 according to an embodiment.

According to an embodiment, the electronic device 101 (e.g., at least one processor 120) may switch the execution screen of the at least one application to a different execution screen and display the different execution screen in operation 1201.

According to an embodiment, the different execution screen may include at least one first element (e.g., a navigation bar, a background color of the displayed content, a background color, or a popup window) different from the prior execution screen. At least one color value related to the at least one first element may differ from at least one color value related to the prior element.

For example, the electronic device 101 (e.g., at least one processor 120) may receive an event (e.g., a user input for switching to a first execution screen 1302) for invoking the different execution screen 1302 while displaying the execution screen 1301 of at least one application as shown in FIG. 13, and the electronic device 101 may display the first execution screen 1302 in response to the event of invoking the first execution screen 1302. The electronic device 101 may switch to, and display, the screen of a different application according to a user input for controlling at least one application. As an example, the electronic device 101 may switch to, and display, a third execution screen 1305 including content 1306 input on a second execution screen 1303 in response to a user input of content (e.g., text or image) on a messaging application as shown in FIG. 13. As an example, the electronic device 101 may switch from the second execution screen 1303 to the third execution screen 1305 including different content (e.g., 1306) and display the same in response to the user's scroll input.

As an example, the electronic device 101 (e.g., at least one processor 120) may display different screens 1401, 1402, and 1403 in real-time as a video included in the execution screen of a video application is played back as shown in FIG. 14.

As an example, the electronic device 101 (e.g., at least one processor 120) may display a popup window (e.g., a popup window giving notifications for received messages) in response to a popup invocation event while displaying the execution screen 1501 of at least one application as shown in FIG. 15. In other words, in response to the popup invocation event, the first execution screen 1502 including the popup window 1503 along with at least one element of the prior execution screen 1501 may be displayed on the display.

According to an embodiment, the electronic device 101 (e.g., at least one processor 120) may identify at least one color value related to at least one element included in the different execution screen in operation 1202. For example, when the different execution screen of the application is displayed, the electronic device 101 may identify a parameter including various kinds of information related to the application and a color value related to at least one of at least one first element included in the different execution screen, and the electronic device 101 may identify at least one color value related to the different execution screen based on the identified parameter.

For example, the electronic device 101 (e.g., at least one processor 120) may identify the color value 1311 related to at least one first element (e.g., a navigation bar or content background color) included in the first execution screen 1302 based on at least part of at least one color value included in the parameter as shown in FIG. 13. The electronic device 101 may identify information related to the current execution state of the application, such as the amount of content (e.g., text) or the color 1304 and 1306 of content (e.g., an image) displayed on the different execution screen (e.g., the second execution screen 1303 or the third execution screen 1305) based on various kinds of information included in the parameter as shown in FIG. 13.

As an example, the electronic device 101 (e.g., at least one processor 120) may identify at least one color value related to the video in real-time as shown in FIG. 14. The electronic device 101 may identify, in real-time, at least one color value related to the video 1401, 1402, and 1403 played based on at least part of at least one color value included in the parameter, or the electronic device 101 may identify, in real-time, at least one color value related to the video 1401, 1402, and 1403 currently played based on various kinds of information related to the application included in the parameter.

As an example, the electronic device 101 (e.g., at least one processor 120) may identify at least one first color value 1505 of the popup window 1503 along with at least one color value 1504 related to at least one element based on at least part of at least one color value included in the parameter as shown in FIG. 15.

According to an embodiment, the electronic device 101 (e.g., at least one processor 120) may identify whether the virtual keyboard application 320 is executed in operation 1203 and, in response to identifying execution of the virtual keyboard application 320, the electronic device 101 (e.g., at least one processor 120) may control the display to display the execution screen of the virtual keyboard application 320 based on the theme identified based on at least part of at least one color value obtained in operation 1204.

For example, the electronic device 101 (e.g., at least one processor 120) may display the execution screen of the virtual keyboard application 320 in the color 1312 corresponding to at least part of a first color value (e.g., an RGB value corresponding to black) 1311 related to at least one first element included in the first execution screen 1302 as shown in FIG. 13. As an example, when switching to the third execution screen 1305 while displaying the execution screen of the virtual keyboard application 320 in the color 1314 corresponding to at least part of the first color value (e.g., blue) 1313 related to at least one first element (e.g., background) 1304 included in the second execution screen 1303 as shown in FIG. 13, the electronic device 101 may display the execution screen of the virtual keyboard application 320 in the color 1316 corresponding to at least part of the color value (e.g., red) 1315 related to the identified content 1306 along with at least part of the first color value 1313 related to the at least one first element 1304 included in the third execution screen 1305.

As an example, the electronic device 101 (e.g., at least one processor 120) may display the execution screen of the virtual keyboard application 320 corresponding to at least part of at least one color value of the video 1401, 1402, and 1403 identified in real-time as shown in FIG. 14.

As an example, the electronic device 101 (e.g., at least one processor 120) may display the execution screen of the virtual keyboard application 320 in the color 1506 corresponding to at least part of at least one first color value (e.g., an RGB value corresponding to blue) 1505 related to the identified popup window 1503 along with at least part of the color value 1504 related to at least one of at least one element as shown in FIG. 15.

According to an embodiment, the electronic device 101 (e.g., at least one processor 120) may change the theme or color value of the execution screen of the virtual keyboard application 320 at a specific time or in real-time.

For example, the electronic device 101 (e.g., at least one processor 120) may change the theme and/or color value of the execution screen of the virtual keyboard application 320 in response to an invocation event for the virtual keyboard application 320, or the electronic device 101 (e.g., at least one processor 120) may change the theme and/or color value of the execution screen of the virtual keyboard application 320 in response to a switch of the execution screen of the application.

As an example, the electronic device 101 (e.g., at least one processor 120) may change the theme and/or color value of the execution screen of the virtual keyboard application 320 at designated time intervals.

According to an embodiment, the electronic device 101 (e.g., at least one processor 120) may dynamically change the theme and/or color of the virtual keyboard application 320 even when switching the execution screen of at least one application to the execution screen of a different application and displaying the same.

Hereinafter, another example electronic device 101 and example method of controlling the electronic devices are described according to various embodiments. No duplicate description is made below in connection with the operations of the electronic device 101.

According to an embodiment, the electronic device 101 may dynamically change the theme and/or color of the execution screen of the virtual keyboard application 320 based on a switch of the state of the electronic device 101.

Figure 16:
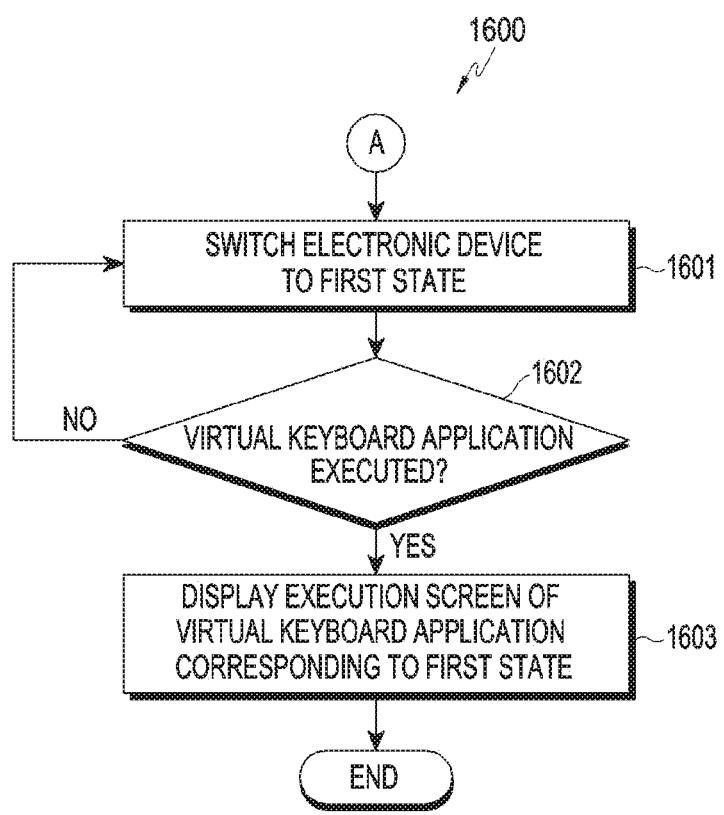
FIG. 16 illustrates a flowchart of another example operation of changing themes and/or colors of an execution screen of a virtual keyboard application of an electronic device according to an embodiment.

FIG. 16 illustrates a flowchart 1600 of an example operation of changing themes and/or colors of an execution screen of a virtual keyboard application 320 of an electronic device 101 according to an embodiment. According to an embodiment, operations of the electronic device 101 are not limited in order to the operations of the electronic device 101 shown in FIG. 16 and may be performed in a different order than that shown. According to an embodiment, other additional operations than the operations of the electronic device 101 shown in FIG. 16 may be performed or some of the operations of the electronic device 101 shown in FIG. 16 may be omitted.

Figure 17:
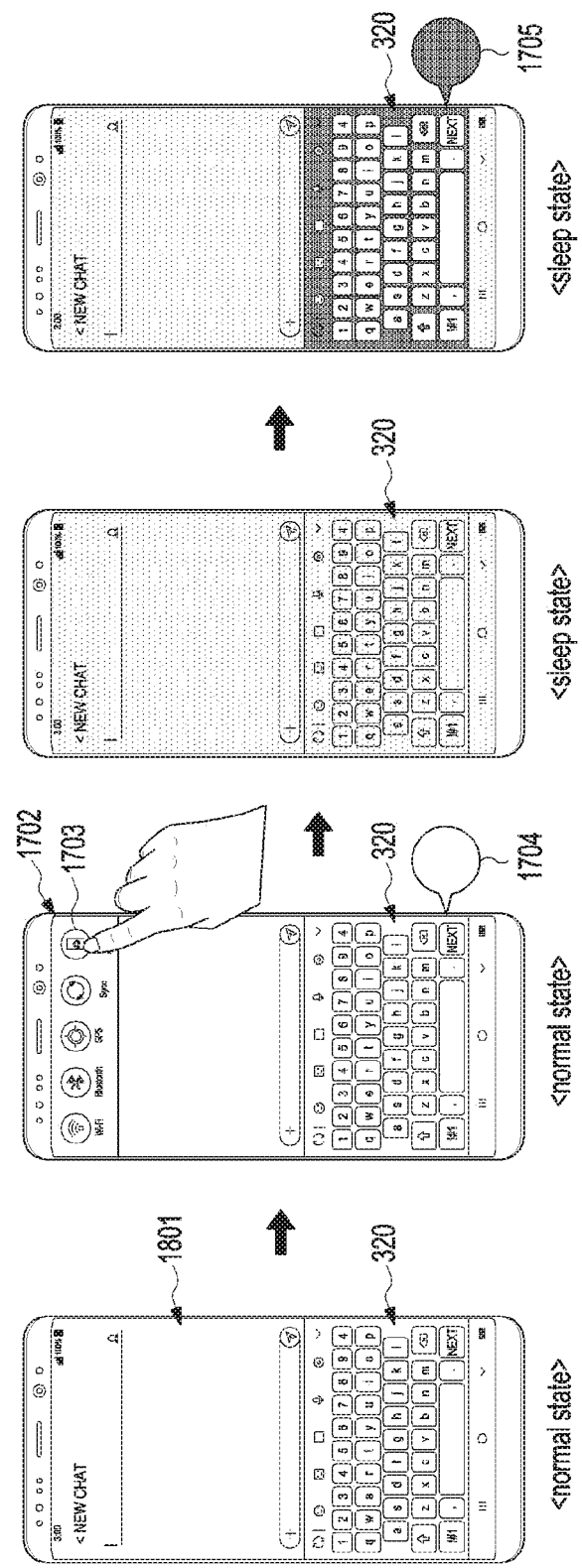
FIG. 17 illustrates a view of another example operation of changing themes and/or colors of an execution screen of a virtual keyboard application of an electronic device according to an embodiment.

FIG. 17 illustrates a view of an example operation of changing themes and/or colors of an execution screen of a virtual keyboard application 320 of an electronic device 101 according to an embodiment.

According to an embodiment, the electronic device 101 (e.g., at least one processor 120) may identify an event in which the state of the electronic device 101 switches to a different state (first state) in operation 1601. As shown in FIG. 17, the electronic device 101 may display an interface 1702 for switching the state of the electronic device 101 to a different state and may receive a user input (e.g., a user input for selecting an icon 1703 for switching to the sleep state) for switching the state of the electronic device 101 from the current state (e.g., the normal state) to a different state (e.g., the sleep state) on the displayed interface 1702.

According to an embodiment, the electronic device 101 (e.g., at least one processor 120) may identify whether the virtual keyboard application 320 is running in operation 1602 and, if the virtual keyboard application 320 is running, the electronic device 101 (e.g., at least one processor 120) may control the display to display the execution screen of the virtual keyboard application 320 corresponding to the different state in operation 1603. For example, when switching the state of the electronic device 101 from the normal state to the sleep state in response to a user input for selecting the sleep state switch icon 1703 as shown in FIG. 17, the electronic device 101 may switch the execution screen of the virtual keyboard application 320 displayed in a light theme 1704 corresponding to the normal state to the execution screen of the virtual keyboard application 320 displayed in a dark theme 1705 corresponding to the sleep state.

Hereinafter, another example electronic device 101 and example method of controlling the electronic devices are described according to various embodiments. No duplicate description is made below in connection with the operations of the electronic device 101.

According to an embodiment, the electronic device 101 may display the execution screen of the virtual keyboard application 320 based on at least one color value related to each of the execution screens of a plurality of applications being displayed on the display.

Figure 18:
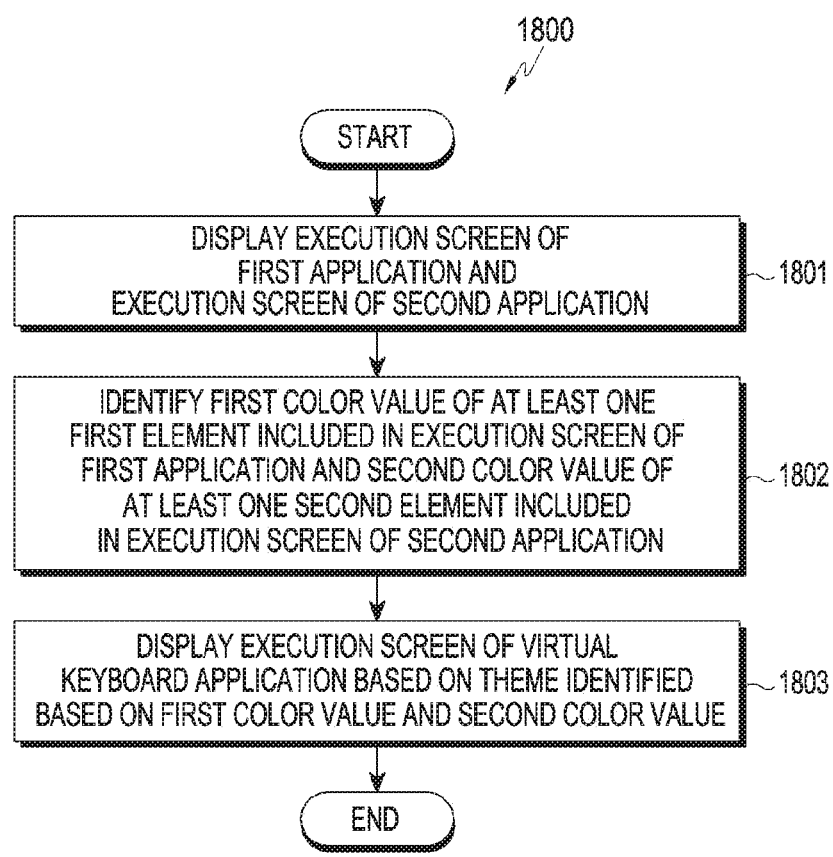
FIG. 18 illustrates a flowchart of an example operation of displaying an execution screen of a virtual keyboard application corresponding to at least one color value of at least one element of an execution screen of each of a plurality of applications of an electronic device according to an embodiment.

FIG. 18 illustrates a flowchart 1800 of an example operation of displaying an execution screen of a virtual keyboard application 320 corresponding to at least one color value of at least one element of an execution screen of each of a plurality of applications of an electronic device 101 according to an embodiment. According to an embodiment, operations of the electronic device 101 are not limited in order to the operations of the electronic device 101 shown in FIG. 18 and may be performed in a different order than that shown. According to an embodiment, other additional operations than the operations of the electronic device 101 shown in FIG. 18 may be performed or some of the operations of the electronic device 101 shown in FIG. 18 may be omitted. FIG. 18 is described below with reference to FIG. 19.

Figure 19:
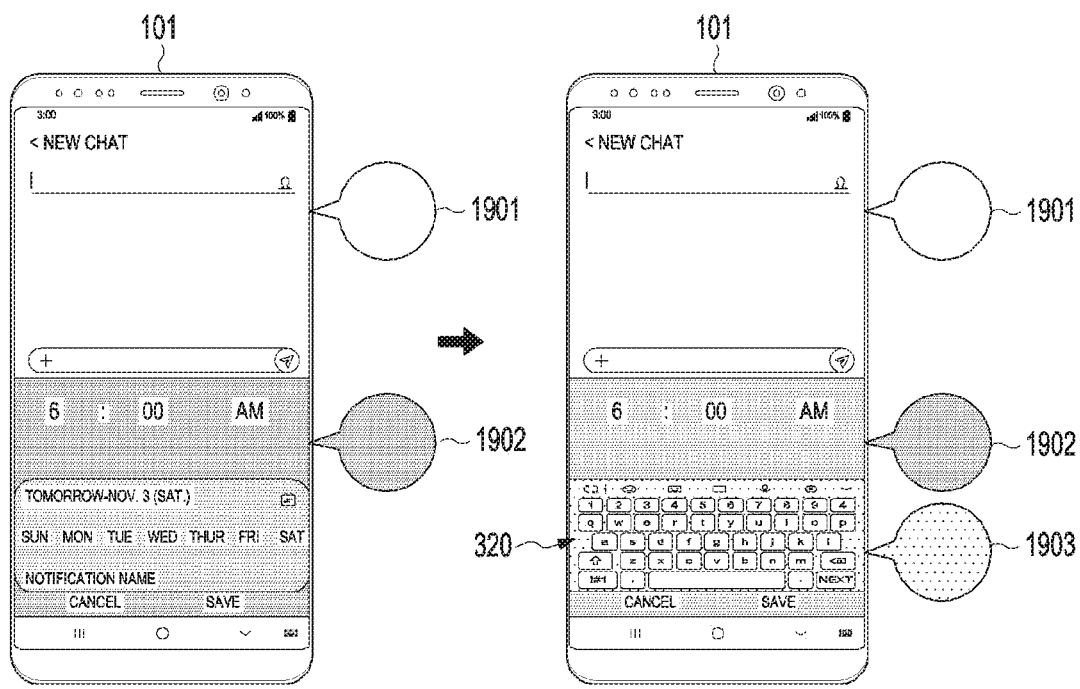
FIG. 19 illustrates a flowchart of an example operation of displaying an execution screen of a virtual keyboard application corresponding to at least one color value of at least one element of an execution screen of each of a plurality of applications of an electronic device according to an embodiment.

FIG. 19 illustrates a view of an example operation of displaying an execution screen of a virtual keyboard application 320 corresponding to at least one color value of at least one element of an execution screen of each of a plurality of applications of an electronic device 101 according to an embodiment.

According to an embodiment, the electronic device 101 (e.g., at least one processor 120) may display an execution screen of a first application and an execution screen of a second application on the display in operation 1801. For example, as shown in FIG. 19, the electronic device may display the execution screen of the first application including at least one first element displayed in at least one first color value 1901 in a first area of the display, and the electronic device may display the execution screen of the second application including at least one second element displayed in at least one second color value 1902 in a second area of the display.

According to an embodiment, the electronic device 101 (e.g., at least one processor 120) may identify a first color value 1901 related to at least one first element included in the execution screen of the first application and a second color value 1902 related to at least one second element included in the execution screen of the second application in operation 1802. Identifying the first color value 1901 and the second color value 1902 may be performed as in operation 203 described above, and no detailed description thereof is given below.

According to an embodiment, the electronic device 101 (e.g., at least one processor 120) may display the execution screen of the virtual keyboard application 320 on the display based on a theme identified based on at least part of at least one first color value 1901 and at least one second color value 1902 in operation 1803. For example, the electronic device 101 may identify a specific color value (e.g., a mean color value) 1903 based on at least part of at least one first color value 1901 and at least one second color value 1902, and the electronic device 101 may display the execution screen of the virtual keyboard application 320 corresponding to the identified specific color value 1903.

Hereinafter, another example electronic device 101 and example method of controlling the electronic devices are described according to various embodiments. No duplicate description is made below in connection with the operations of the electronic device 101.

According to an embodiment, the electronic device 101 may display the execution screen of the virtual keyboard application 320 corresponding to the color value related to at least one of at least one element of the screen of an application focused among the execution screens of a plurality of applications being displayed on the display.

Figure 20:
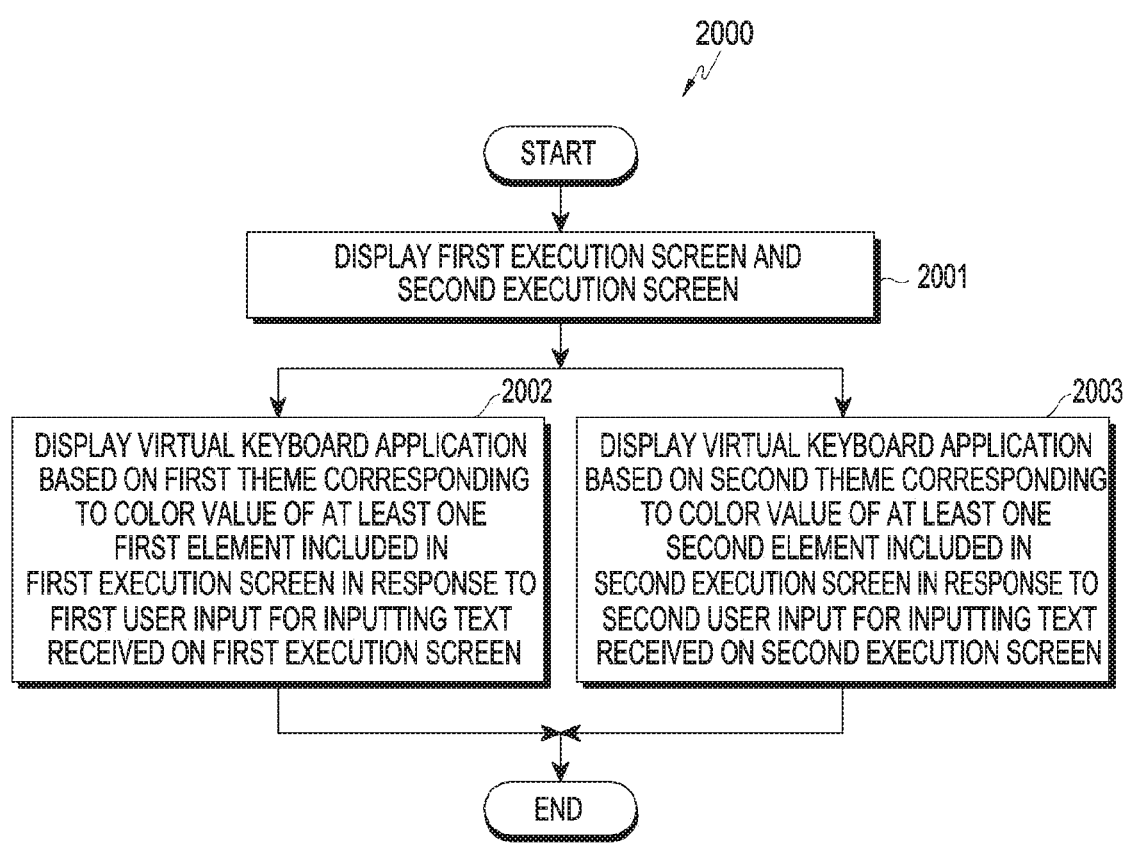
FIG. 20 illustrates a flowchart of an example operation of displaying an execution screen of a virtual keyboard application corresponding to at least one color value of at least one element of an execution screen of a focused application of an electronic device according to an embodiment.

FIG. 20 illustrates a flowchart 2000 of an example operation of displaying an execution screen of a virtual keyboard application 320 corresponding to at least one color value of at least one element of an execution screen of a focused application of an electronic device 101 according to an embodiment. According to an embodiment, operations of the electronic device 101 are not limited in order to the operations of the electronic device 101 shown in FIG. 20 and may be performed in a different order than that shown. According to an embodiment, other additional operations than the operations of the electronic device 101 shown in FIG. 20 may be performed or some of the operations of the electronic device 101 shown in FIG. 20 may be omitted. FIG. 20 is described below with reference to FIG. 21.

Figure 21:
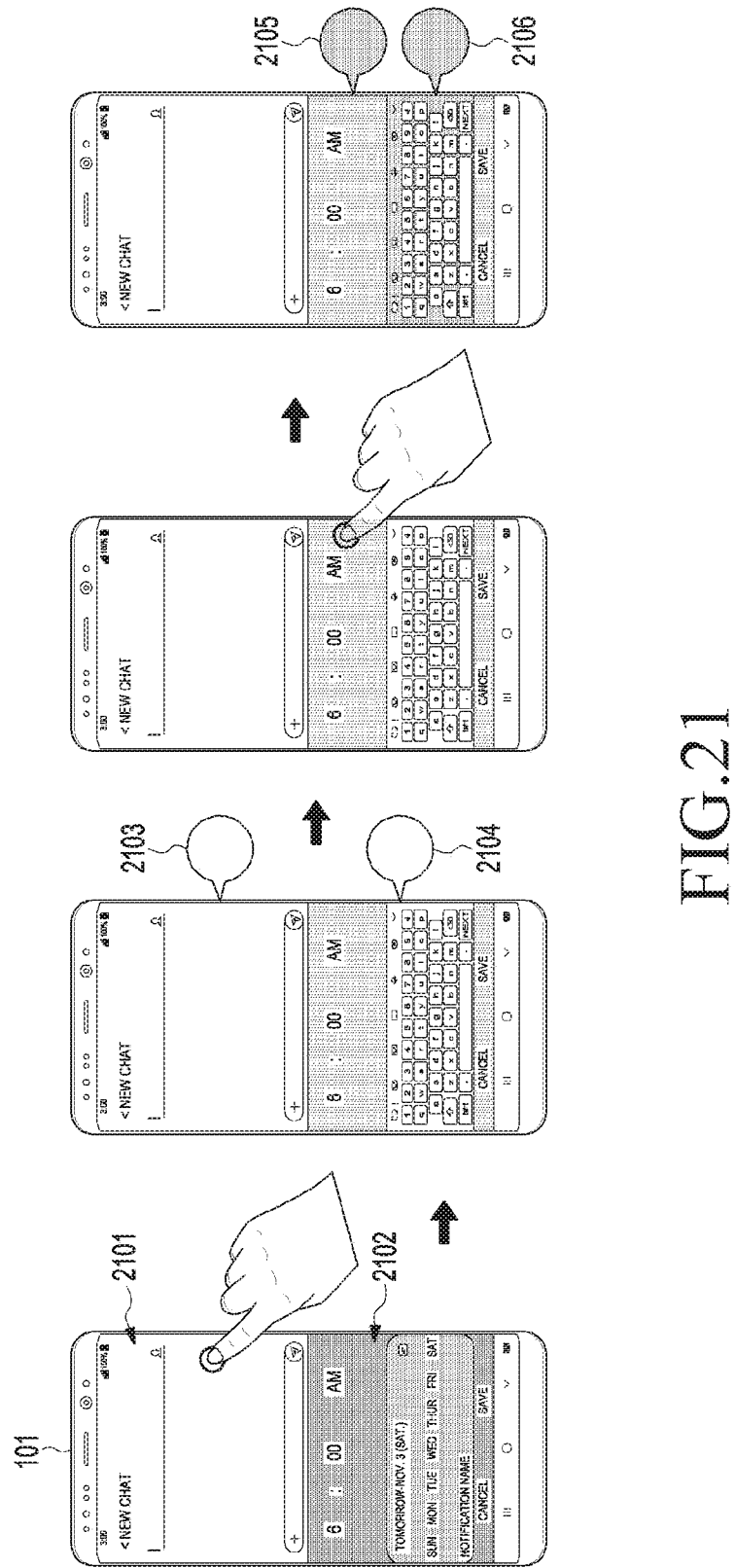
FIG. 21 illustrates a view of an example operation of displaying an execution screen of a virtual keyboard application corresponding to at least one color value of each of execution screens of a plurality of applications of an electronic device according to an embodiment.

FIG. 21 illustrates a view of an example operation of displaying an execution screen of a virtual keyboard application 320 corresponding to a color value related to at least one of the respective execution screens of a plurality of applications of an electronic device 101 according to an embodiment.

According to an embodiment, the electronic device 101 (e.g., at least one processor 120) may control the display to display the execution screen 2101 of the first application and the execution screen 2102 of the second application in operation 2001.

According to an embodiment, the electronic device 101 (e.g., at least one processor 120) may control the display to display the virtual keyboard application 320 based on a first theme 2104 corresponding to at least part of a color value 2103 related to at least one first element included in the execution screen 2101 of the first application in response to a first user input for inputting text received on the execution screen 2101 of the first application in operation 2002, or the electronic device 101 (e.g., at least one processor 120) may control the display to display the virtual keyboard application 320 based on a second theme 2106 corresponding to at least part of a color value 2105 related to at least one second element included in the execution screen 2102 of the second application in response to a second user input for inputting text received on the execution screen 2102 of the second application in operation 2003.

Figure 22:
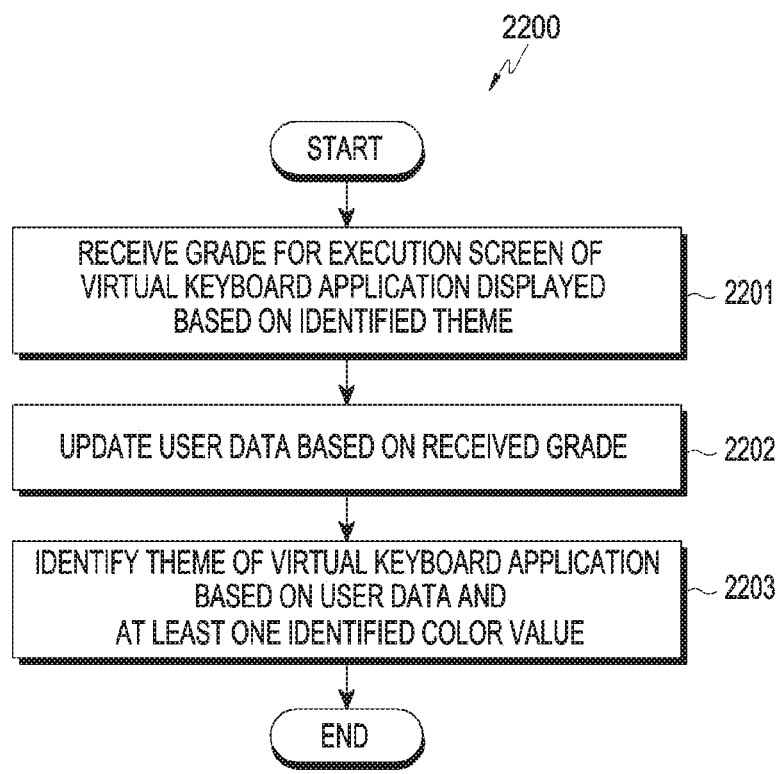
FIG. 22 illustrates a flowchart of operations of an electronic device obtaining user data and displaying an execution screen of a virtual keyboard application based on the obtained user data according to an embodiment.
Figure 23:
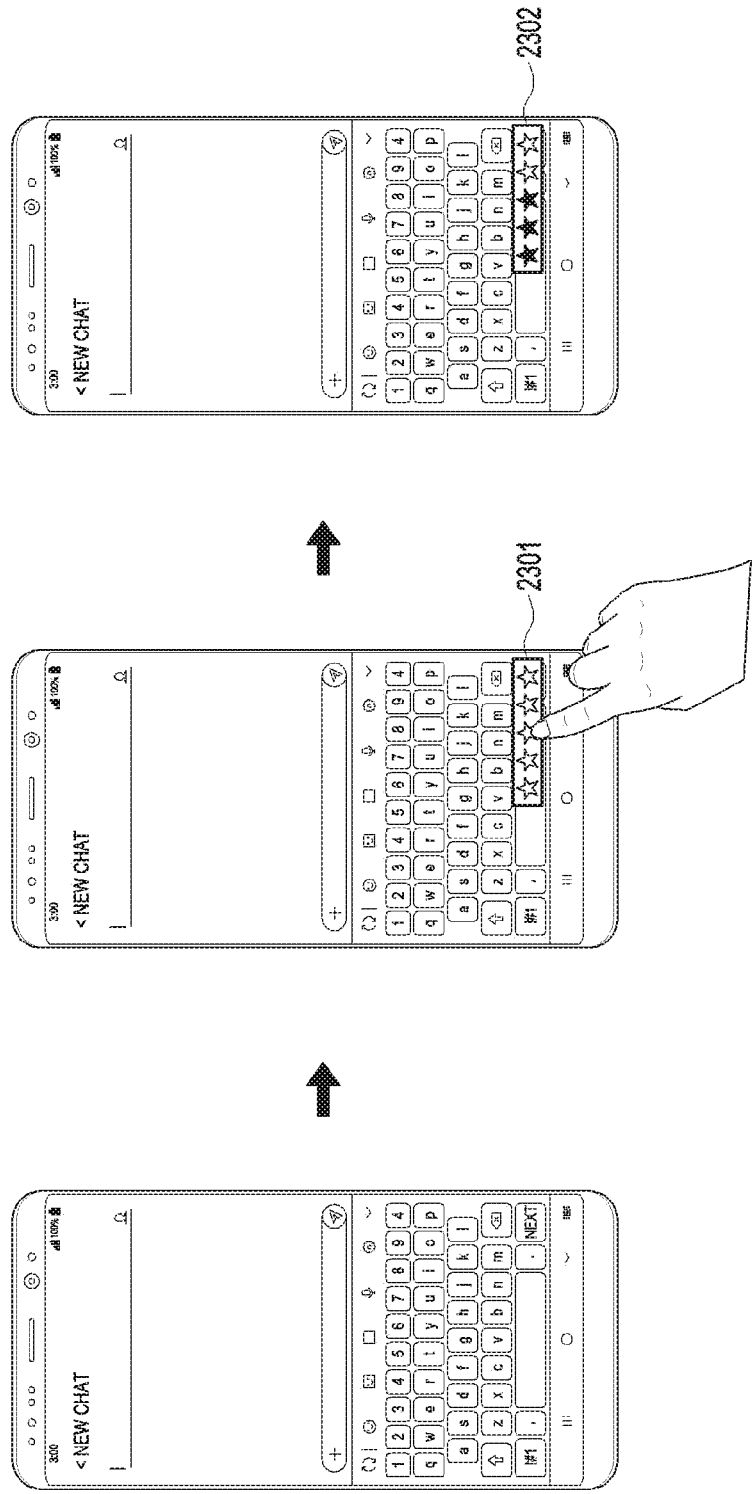
FIG. 23 illustrates a view of operations of an electronic device obtaining user data and displaying an execution screen of a virtual keyboard application based on the obtained user data according to an embodiment.

Described below in connection with FIGS. 22 and 23 are example operations of obtaining user data of the electronic device 101 and displaying the execution screen of the virtual keyboard application 320 based on the obtained user data according to an embodiment. No duplicate description is made below in connection with the operations of the electronic device 101.

According to an embodiment, the electronic device 101 may obtain user data for the execution screen of the virtual keyboard application 320, identify pattern information based on the obtained user data, and display an application execution screen including an element displayed in a color more appropriate for the user of the electronic device 101.

FIG. 22 illustrates a flowchart 2200 illustrating operations of an electronic device 101 obtaining user data and displaying an execution screen of a virtual keyboard application 320 based on the obtained user data according to an embodiment. According to an embodiment, operations of the electronic device 101 are not limited in order to the operations of the electronic device 101 shown in FIG. 22 and may be performed in a different order than that shown. According to an embodiment, other additional operations than the operations of the electronic device 101 shown in FIG. 22 may be performed or some of the operations of the electronic device 101 shown in FIG. 22 may be omitted. FIG. 22 is described below with reference to FIG. 23.

FIG. 23 illustrates a view of operations of an electronic device 101 obtaining user data and displaying an execution screen of a virtual keyboard application 320 based on the obtained user data according to an embodiment.

According to an embodiment, the electronic device 101 (e.g., at least one processor 120) may receive a grade for the execution screen of the virtual keyboard application 320 in operation 2201. For example, as shown in FIG. 23, the electronic device 101 may display the execution screen of the virtual keyboard application 320 corresponding to at least one color value and an interface 2301 for receiving a grade related to the displayed execution screen of the virtual keyboard application 320 as shown in FIG. 23. The electronic device 101 may receive a user input for assigning a grade 2302 for the execution screen of the virtual keyboard application 320 on the displayed interface 2301.

According to an embodiment, the electronic device 101 (e.g., at least one processor 120) may update the user data based on the received grade 2302 in operation 2202. For example, the electronic device 101 may identify the user's preference based on the grade 2302 related to the displayed execution screen of the virtual keyboard application 320 and may store the identified preference as user data.

According to an embodiment, the electronic device 101 (e.g., at least one processor 120) may display the execution screen of the virtual keyboard application 320 corresponding to the at least one identified color value and the user data in operation 2203. For example, the electronic device 101 may apply the identified user data to the at least one identified color value, displaying the execution screen of the virtual keyboard application 320 more appropriate for the user's preference. The electronic device 101 may learn the user's preferred color value based on the accumulated user data, and the electronic device 101 may display the execution screen of the virtual keyboard application 320 corresponding to at least one color value of at least one element included in the execution screen of the at least one application and the learned color value.

Other example operations of the electronic device 101 are described below in connection with FIGS. 24 and 25. No duplicate description is made below in connection with the operations of the electronic device 101.

Figure 24:
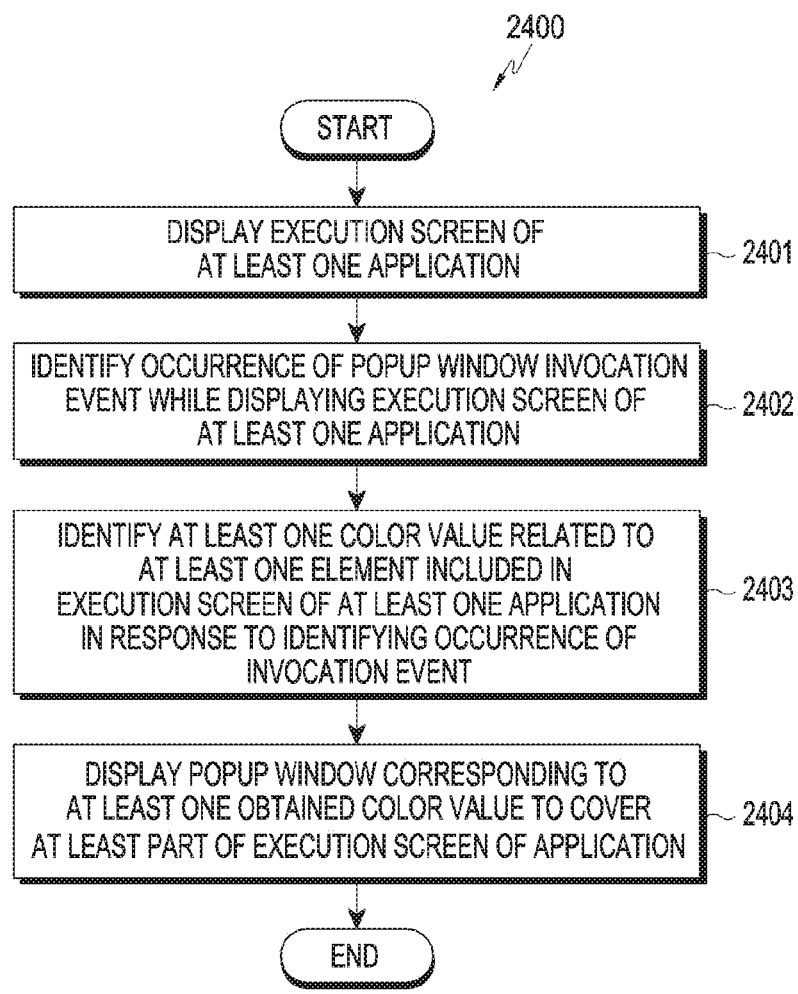
FIG. 24 illustrates a flowchart of example operations of an electronic device according to an embodiment.

FIG. 24 illustrates a flowchart 2400 of example operations of an electronic device 101 according to an embodiment. According to an embodiment, operations of the electronic device 101 are not limited in order to the operations of the electronic device 101 shown in FIG. 24 and may be performed in a different order than that shown. According to an embodiment, other additional operations than the operations of the electronic device 101 shown in FIG. 24 may be performed or some of the operations of the electronic device 101 shown in FIG. 24 may be omitted. FIG. 24 is described below with reference to FIG. 25.

Figure 25:
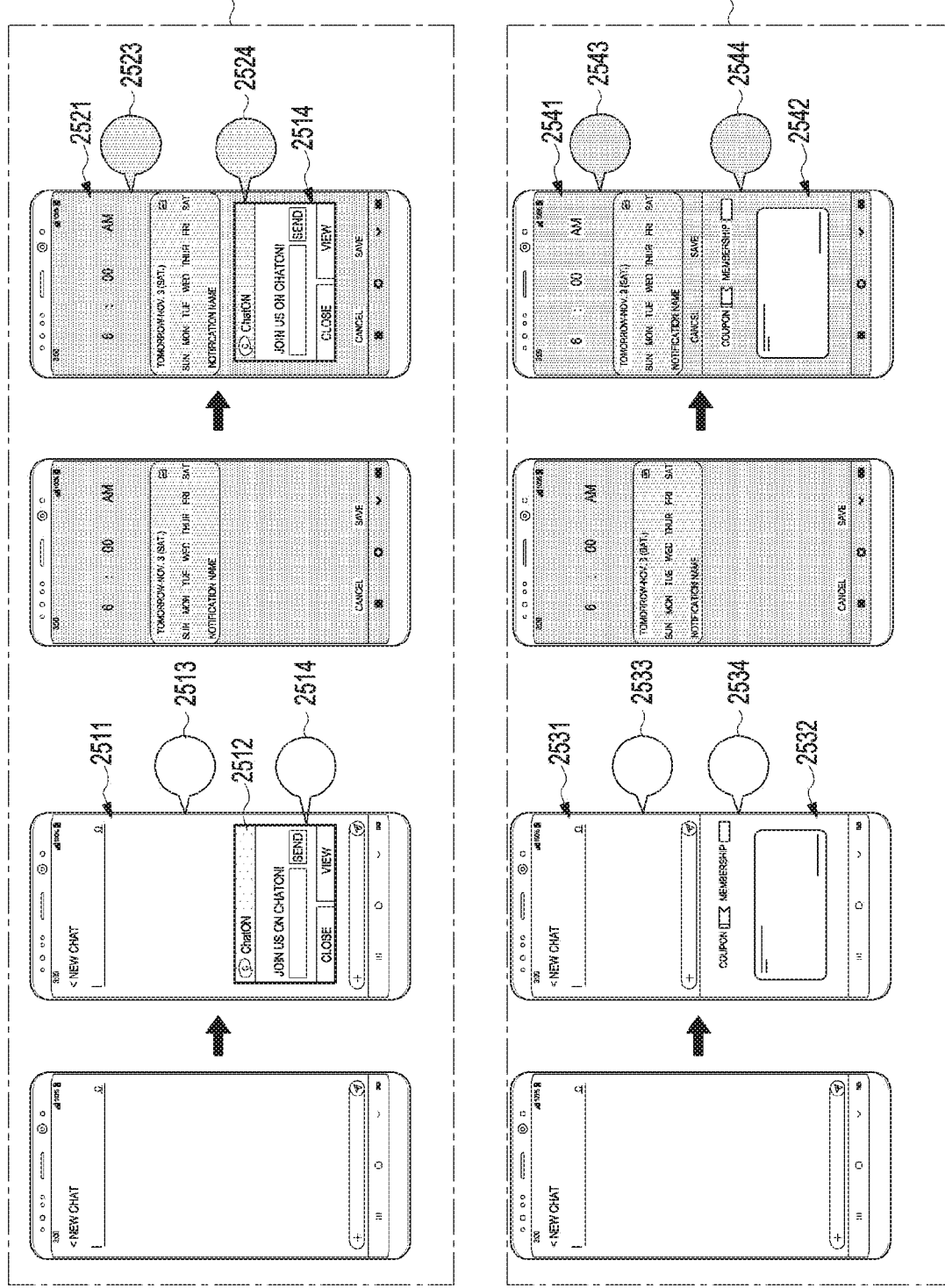
FIG. 25 illustrates a view of example operations of an electronic device according to an embodiment.

FIG. 25 illustrates a view of example operations of an electronic device 101 according to an embodiment.

According to an embodiment, when another application is executed, the electronic device 101 may display the execution screen of the other application corresponding to a color value related to at least one element included in the execution screen of the application being displayed on the display.

According to an embodiment, the electronic device 101 (e.g., at least one processor 120) may display the execution screen of the at least one application on the display in operation 2401. Since operation 2401 of the electronic device 101 may be performed as in operation 401 of the electronic device 101 (e.g., at least one processor 120), no repetitive description is presented below.

According to an embodiment, the electronic device 101 (e.g., at least one processor 120) may identify an occurrence of a popup window invocation event while displaying the execution screen of the at least one application in operation 2402. For example, as shown in 2501 of FIG. 25, the electronic device 101 may identify an occurrence of an invocation event for a popup window 2512 and 2514 to notify the user that an event related to the other application occurs (e.g., a message receipt notification for a messaging application).

According to an embodiment, the electronic device 101 (e.g., at least one processor 120) may identify a color value related to at least one of at least one element included in the execution screen of the at least one application being displayed, based on identifying the occurrence of the invocation event in operation 2403. Since operation 2403 of the electronic device 101 may be performed as in operation 406 of the electronic device 101 (e.g., at least one processor 120), no repetitive description is presented below.

According to an embodiment, the electronic device 101 (e.g., at least one processor 120) may control the display to display the popup window corresponding to the at least one obtained color value to cover at least part of the execution screen of the application in operation 2404. For example, as shown in FIG. 25, the electronic device 101 may display a popup window 2514 in a color 2514 corresponding to at least part of a color value (e.g., an RGB value corresponding to white) 2513 related to at least one of at least one first element included in the execution screen 2511 of at least one first application, or the electronic device 101 may display a popup window 2512 in a color 2524 corresponding to at least part of a color value (e.g., an RGB value corresponding to gray) 2523 related to at least one of at least one second element included in the execution screen 2521 of at least one second application.

According to an embodiment, similar to displaying the popup window related to the other application while displaying the execution screen of the application on the display, the electronic device 101 (e.g., at least one processor 120), if while the execution screen of an application is displayed on the display the execution screen of another application is displayed, may display the execution screen of the other application corresponding to the color value related to at least one of at least one element included in the execution screen of the application. For example, as shown in 2502 of FIG. 25, the electronic device 101 may identify an event (e.g., receiving a user input to execute the other application) of requesting to display the execution screen 2532 and 2542 of the other application while displaying the execution screen 2531 and 2541 of the application is displayed on the display. In response to the execution request event, the electronic device 101 may display the execution screen 2531 and 2541 of the application, which used to be displayed in the entire area of the display, in a first area of the display and the execution screens 2532 and 2542 of the other application in a second area which is an area other than the first area of the display. The electronic device 101 may display the execution screen 2532 and 2542 of the other application corresponding to the color value related to at least one of at least one element included in the execution screen 2531 and 2541 of the application. In other words, the electronic device 101 may set a theme and/or color value of the execution screen 2532 and 2542 of the other application based on at least part of the color value related to at least one of at least one element included in the execution screen 2531 and 2541 of the application. For example, as shown in 2502 of FIG. 25, the electronic device may display the execution screen 2532 of the second application in a color 2534 corresponding to at least part of at least one color value (e.g., an RGB value corresponding to white) 2533 related to the execution screen 2531 of the first application, or the electronic device may display the execution screen 2542 of the second application in a color 2544 corresponding to at least part of at least one color value (e.g., an RGB value corresponding to gray) 2543 related to the execution screen 2541 of the third application.

According to an embodiment, the operation of displaying the execution screen of the other application corresponding to the color value of at least one element included in the execution screen of the application being displayed on the display, which is not described herein, may be performed as the operation of displaying the execution screen of the virtual keyboard application 320 corresponding to the color value of at least one element included in the execution screen of the application being displayed on the display, as described above, and no duplicate description thereof is given herein.

According to various embodiments, an electronic device comprises a display, at least one processor 120, and a memory 130 configured to store at least one application including a virtual keyboard application 320, each of the at least one application including an execution screen including at least one element, wherein the memory 130 stores instructions executed to enable the at least one processor 120 to display the execution screen of the at least one application on the display, identify an occurrence of an invocation event of an execution screen of the virtual keyboard application 320 while displaying the execution screen of the at least one application, identify at least one color value related to the at least one element included in the execution screen of the at least one application in response to identifying the occurrence of the invocation event, and display the execution screen of the virtual keyboard application 320 corresponding to the at least one identified color value on the display.

According to various embodiments, the instructions may be configured to enable the at least one processor 120 to, when the virtual keyboard application 320 is executed, identify at least one parameter including information related to the application and the at least one identified color value and identify a theme of the virtual keyboard application based on at least part of the at least one identified parameter.

According to various embodiments, the memory 130 may be configured to store information for a first theme corresponding to a first color value and information for a second theme corresponding to a second color value. The instructions may be configured to enable the at least one processor to, as at least part of displaying the execution screen of the virtual keyboard application 320 on the display based on at least part of the theme corresponding to the at least one identified color value, detect a specific color value based on at least part of the at least one color value included in the at least one parameter, identify the information for the first theme and the information for the second theme stored in the memory, when the detected specific color value is the first color value, identify the first theme corresponding to the first color value as the theme of the virtual keyboard application, and when the detected specific color value is the second color value, identify the second theme corresponding to the second color value as the theme of the virtual keyboard application.

According to various embodiments, the instructions may be configured to enable the at least one processor 120 to, as at least part of detecting the specific color value, detect a luminance value based on a mean value of the at least one color value.

According to various embodiments, the instructions may be configured to enable the at least one processor 120 to identify the information along with the at least one color value included in the parameter and display the execution screen of the virtual keyboard application 320 corresponding to the information on the display.

According to various embodiments, the instructions may be configured to enable the at least one processor 120 to identify a theme setting state of the virtual keyboard application 320 and display the execution screen of the virtual keyboard application on the display based on at least part of the identified theme setting state.

According to various embodiments, the instructions may be configured to enable the at least one processor 120 to identify a state of the electronic device 101 and display the execution screen of the virtual keyboard application on the display based on at least part of the identified state of the electronic device.

According to various embodiments, the instructions may be configured to enable the at least one processor 120 to switch the execution screen of the at least one application being displayed to a first execution screen and display on the display, obtain a first color value of at least one first element included in the first execution screen, and display the execution screen of the virtual keyboard application 320 on the display based on a first theme identified based on at least part of the obtained first color value.

According to various embodiments, the instructions may be configured to enable the at least one processor 120 to, when the state of the electronic device 101 switches to a first state, display the execution screen of the virtual keyboard application 320 on the display based on a second theme corresponding to the first state instead of the first theme.

According to various embodiments, the at least one application may include a first application and a second application. The instructions may be configured to enable the at least one processor 120 to, as at least part of identifying the at least one color value of the at least one element, identify at least one first color value of at least one first element included in an execution screen of the first application and at least one second color value of at least one second element included in an execution screen of the second application and, as at least part of displaying the execution screen of the virtual keyboard application 320, display the execution screen of the virtual keyboard application on the display based on a theme of the virtual keyboard application 320 identified based on at least part of the first color value and the second color value.

According to various embodiments, the at least one application may include a first application and a second application. The instructions may be configured to enable the at least one processor 120 to display an execution screen of the first application and an execution screen of the second application on the display, display the virtual keyboard application 320 corresponding to at least one first color value of at least one first element included in the execution screen of the first application, on the display, in response to a first user input for inputting a text received on the execution screen of the first application, and display the virtual keyboard application 320 corresponding to at least one second color value of at least one second element included in the execution screen of the second application, on the display, in response to a second user input for inputting a text received on the execution screen of the second application.

According to various embodiments, a method of controlling an electronic device 101 comprises displaying an execution screen of at least one application on a display; identifying an occurrence of an invocation event of an execution screen of a virtual keyboard application 320 while displaying the execution screen of the at least one application; identifying at least one color value related to at least one element included in the execution screen of the at least one application being displayed on the display in response to identifying the occurrence of the invocation event; and displaying the execution screen of the virtual keyboard application 320 corresponding to the at least one identified color value.

According to various embodiments, the method may further comprise, when the virtual keyboard application 320 is executed, identifying at least one parameter including information related to the application and the at least one identified color value and identifying a theme of the virtual keyboard application based on at least part of the at least one identified parameter.

According to various embodiments, displaying the execution screen of the virtual keyboard application on the display based on at least part of the theme corresponding to the at least one identified color value may include detecting a specific color value based on at least part of the at least one color value included in the at least one parameter, identifying the information for the first theme and the information for the second theme stored in a memory of the electronic device, when the detected specific color value is the first color value, identifying the first theme corresponding to the first color value as the theme of the virtual keyboard application, and when the detected specific color value is the second color value, identifying the second theme corresponding to the second color value as the theme of the virtual keyboard application.

According to various embodiments, detecting the specific color value may include detecting a luminance value based on a mean value of the at least one color value.

According to various embodiments, the method may further comprise identifying the information along with the at least one color value included in the parameter and displaying the execution screen of the virtual keyboard application corresponding to the information on the display.

According to various embodiments, the method may further comprise identifying a theme setting state of the virtual keyboard application 320 and, when the identified theme setting state is a variable theme setting state, displaying the execution screen of the virtual keyboard application on the display based on at least part of the identified theme setting state.

According to various embodiments, the method may further comprise identifying a state of the electronic device 101 and, unless the identified state of the electronic device 101 is a preset state, displaying the execution screen of the virtual keyboard application on the display based on at least part of the identified state of the electronic device.

According to various embodiments, the method may further comprise switching the execution screen of the at least one application being displayed to a first execution screen and displaying, obtaining a first color value of at least one first element included in the first execution screen, and displaying the execution screen of the virtual keyboard application on the display based on a first theme identified based on at least part of the obtained first color value.

According to various embodiments, an electronic device 101 comprises a display, at least one processor 120, and a memory 130 configured to store at least one application, each of the at least one application including an execution screen including at least one element, wherein the memory stores instructions executed to enable the at least one processor 120 to control the display to display the execution screen of the application, identify an occurrence of a popup window invocation event while displaying the execution screen of the application, identify at least one color value related to the at least one element included in the execution screen of the application in response to identifying the occurrence of the invocation event, and display a popup window corresponding to the at least one identified color value on the display to cover at least part of the execution screen of the application.

As is apparent from the foregoing description, according to various embodiments, there may be provided an electronic device and method of controlling the same may make the respective execution screens of the applications displayed on the display similar in color to each other, thereby reducing screen burn-in.

According to various embodiments, there may be provided an electronic device and method of controlling the same may allow the respective execution screens of the applications to be displayed in different colors on the display, thus making the applications more distinctly noticeable.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a display;
at least one processor; and
a memory configured to store instructions that when executed are configured to enable the at least one processor to:
control the display to display an execution screen of a first application including at least one first element and an execution screen of a second application including at least one second element,
identify an occurrence of an event for displaying an execution screen of a virtual keyboard application while displaying the execution screens of the first and second applications,
based on the occurrence of the event, identify at least one first color value related to the displayed at least one first element included in the execution screen of the first application and at least one second color value related to the displayed at least one second element included in the execution screen of the second application, and
control the display to display the execution screen of the virtual keyboard application based on at least part of the at least one first color value and the at least one second color value together with the execution screen of the first application and the execution screen of the second application.

2. The electronic device of claim 1, wherein the instructions are configured to enable the at least one processor to:
based on the virtual keyboard application being executed, identify at least one first parameter including information related to the first application and the at least one first color value and at least one second parameter including information related to the second application and the at least one second color value, and
identify a theme of the virtual keyboard application based on at least part of the at least one first parameter and the at least one second parameter.

3. The electronic device of claim 2, wherein the memory is configured to store first information for a first theme corresponding to a first color value and second information for a second theme corresponding to a second color value, and
wherein the instructions are configured to enable the at least one processor to:
identify a specific color value based on at least part of the at least one first color value and the at least one second color value,
identify whether the identified specific color value corresponds to the first theme or the second theme based on the first information and the second information which are stored in the memory,
based on the identified specific color value corresponding to the first color value, identify the first theme corresponding to the first color value as the theme of the virtual keyboard application, and
based on the identified specific color value corresponding to the second color value, identify the second theme corresponding to the second color value as the theme of the virtual keyboard application.

4. The electronic device of claim 1, wherein the instructions are configured to enable the at least one processor to:
identify a theme setting state of the virtual keyboard application, and
control the display to display the execution screen of the virtual keyboard application based on at least part of the identified theme setting state.

5. The electronic device of claim 1, wherein the instructions are configured to enable the at least one processor to:
identify a state of the electronic device, and
control the display to display the execution screen of the virtual keyboard application based on at least part of the identified state of the electronic device.

6. The electronic device of claim 1, wherein the instructions are configured to enable the at least one processor to:
control the display to display the execution screen of the virtual keyboard application based on a first theme identified based on at least part of the at least one first color value and the at least one second color value.

7. The electronic device of claim 6, wherein the instructions are configured to enable the at least one processor to:
when a state of the electronic device switches to a first state, control the display to display the execution screen of the virtual keyboard application based on a second theme corresponding to the first state instead of the first theme.

8. A method of controlling an electronic device, the method comprising:
displaying an execution screen of a first application including at least one first element and an execution screen of a second application including at least one second element on a display of the electronic device;
identifying an occurrence of an event for displaying an execution screen of a virtual keyboard application while displaying the execution screens of the first and second applications;
based on the occurrence of the event, identifying at least one first color value related to the displayed at least one first element included in the execution screen of the first application and at least one second color value related to the displayed at least one second element included in the execution screen of the second application; and
displaying the execution screen of the virtual keyboard application based on at least part of the at least one first color value and the at least one second color value together with the execution screen of the first application and the execution screen of the second application.

9. The method of claim 8, further comprising:
based on the virtual keyboard application being executed, identifying at least one first parameter including information related to the first application and the at least one first color value and at least one second parameter including information related to the second application and the at least one second color value; and
identifying a theme of the virtual keyboard application based on at least part of the at least one first parameter and the at least one second parameter.

10. The method of claim 8, further comprising:
identifying a theme setting state of the virtual keyboard application; and
displaying the execution screen of the virtual keyboard application on the display based on at least part of the identified theme setting state.

11. The method of claim 8, further comprising:
identifying a state of the electronic device; and displaying the execution screen of the virtual keyboard application on the display based on at least part of the identified state of the electronic device.

12. The method of claim 8, further comprising:
displaying the execution screen of the virtual keyboard application on the display based on a first theme identified based on at least part of the at least one first color value and the at least one second color value.

13. The method of claim 9, wherein displaying the execution screen of the virtual keyboard application on the display:
identifying a specific color value based on at least part of the at least one first color value and the at least one second color value;
identifying whether the identified specific color value corresponds to a first theme or a second theme based on first information and second information which are stored in a memory of the electronic device;
based on the identified specific color value corresponding to at least one first color value, identifying the first theme corresponding to the at least one first color value as the theme of the virtual keyboard application; and
based on the identified specific color value corresponding to at least one second color value, identifying the second theme corresponding to the at least one second color value as the theme of the virtual keyboard application.

14. An electronic device, comprising:
a display;
at least one processor; and
a memory configured to store instructions that when executed are configured to enable the at least one processor to:
control the display to display an execution screen of a first application including at least one first element and an execution screen of a second application including at least one second element,
identify an occurrence of an event for displaying a popup window while displaying the execution screens of the first and second applications,
based on the occurrence of the event, identify at least one first color value related to the displayed at least one first element included in the execution screen of the first application and at least one second color value related to the displayed at least one second element included in the execution screen of the second application, and
based on at least part of the at least one first color value and the at least one second color value, control the display to display a popup window to cover at least part of the execution screen of the first application and the execution screen of the second application.

* * * * *